US012524127B2

(12) United States Patent
Zhou et al.

(10) Patent No.: US 12,524,127 B2
(45) Date of Patent: Jan. 13, 2026

(54) ACTIVITY RECOGNITION METHOD, DISPLAY METHOD, AND ELECTRONIC DEVICE

(71) Applicant: HUAWEI TECHNOLOGIES CO., LTD., Guangdong (CN)

(72) Inventors: Caifa Zhou, Wuhan (CN); Yongliang Wang, Xi'an (CN); Dandan Zeng, Beijing (CN); Huafeng Ba, Xi'an (CN); Jianhua Cai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 18/329,928

(22) Filed: Jun. 6, 2023

(65) Prior Publication Data

US 2023/0315255 A1 Oct. 5, 2023

Related U.S. Application Data

(63) Continuation of application No. PCT/CN2021/129507, filed on Nov. 9, 2021.

(30) Foreign Application Priority Data

Dec. 8, 2020 (CN) .......................... 202011423403.9

(51) Int. Cl.
*G06F 3/04817* (2022.01)
*G01C 21/16* (2006.01)
*G06F 18/20* (2023.01)

(52) U.S. Cl.
CPC ..... *G06F 3/04817* (2013.01); *G01C 21/1654* (2020.08); *G06F 18/20* (2023.01)

(58) Field of Classification Search
CPC .......................... G06F 3/04817; G01C 21/16
See application file for complete search history.

(56) References Cited

U.S. PATENT DOCUMENTS

2016/0330586 A1* 11/2016 Venkatraman ......... G01C 21/16
2023/0202486 A1* 6/2023 Nakaoka ................ G01C 21/16
                                                                    701/23
(Continued)

FOREIGN PATENT DOCUMENTS

CN         106020348 A      10/2016
CN         106197463 A      12/2016
(Continued)

OTHER PUBLICATIONS

Nair Nitin et al: "Human Activity Recognition Using Temporal Convolutional Network", Sep. 20, 2018, pp. 1-8, XP059109116.
(Continued)

*Primary Examiner* — Anil K Bhargava
(74) *Attorney, Agent, or Firm* — Rimon PC

(57) ABSTRACT

Embodiments of an activity recognition method, a display method, and an electronic device are disclosed. The electronic device can obtain a plurality of poses of the electronic device, and obtain one or more pieces of feature data based on the plurality of poses by using a plurality of one-dimensional convolutional layers. Each of the one or more pieces of feature data indicates a state of motion of a person holding the electronic device, an action of the person, or a vehicle transporting the person. Then, the electronic device displays, as an icon, the types of information indicated by the one or more pieces of feature data. According to the method, feature data for representing an activity state of the person is extracted by using the one-dimensional convolutional layers, and features for representing the activity state of the person may be extracted by using the plurality of one-dimensional convolutional layers.

14 Claims, 21 Drawing Sheets

(56) References Cited

U.S. PATENT DOCUMENTS

2023/0289034 A1* 9/2023 Zhang ................. H04L 67/34
2024/0397323 A1* 11/2024 Devine ............... G06F 3/04883

FOREIGN PATENT DOCUMENTS

| CN | 106461399 A | 2/2017 |
| CN | 107391604 A | 11/2017 |
| CN | 110058699 A | 7/2019 |
| CN | 110569928 A | 12/2019 |
| WO | 2020072137 A1 | 4/2020 |

OTHER PUBLICATIONS

Nair et al., "Human Activity Recognition Using Temporal Convolutional Network," iWOAR '18, Sep. 20-21, 2018, Berlin Germany; 8 total pages.
"Digital Map Market Size, Share & Trends Analysis Report by Type (GIS, LiDAR, Digital Orthophotography, Aerial Photography, GPS), by Usage, by Services, by Application, by Region, and Segment Forecasts," 2023-2030, URL: https://www.grandviewresearch.com/industry-analysis/digital-map-market; 8 total pages.
Activity recognition, Wikipedia, URL: https://en.wikipedia.org/wiki/Activity_recognition, Feb. 2008; 14 total pages.

* cited by examiner ural motion. The state of motion of the person includes being at a standstill, walking, running, and the like. The action of the person includes standing, sitting, squatting, lying, and the like. The vehicle transporting the person may include any type of vehicle (for example, in-vehicle, or a high-speed train), an elevator, an escalator, and the like in which is being used by the person or in which the person is currently within. The pose of the electronic device can reflect the activity state of the person holding the electronic device. Based on this, the electronic device obtains the plurality of poses of the electronic device in a time period, and then extracts the one or more pieces of feature data from the plurality of poses by using an activity recognition (AR) module. The one or more pieces of feature data indicate the different types of information of the person holding the electronic device. Then, the electronic device controls the electronic device to display, on the icon, the types of the information indicated by the one or more pieces of feature data. In some embodiments, the "time period" may be preset, and the time period is, for example, 5 seconds (s). In addition, the AR module performs a feature extraction of the plurality of poses by using the plurality of one-dimensional convolutional layers, to obtain the one or more pieces of feature data.

ACTIVITY RECOGNITION METHOD, DISPLAY METHOD, AND ELECTRONIC DEVICE

CROSS-REFERENCE TO RELATED APPLICATIONS

This application is a continuation of International Application No. PCT/CN2021/129507, filed on Nov. 9, 2021, which claims priority to Chinese Patent Application No. 202011423403.9, filed on Dec. 8, 2020. The disclosures of the aforementioned applications are hereby incorporated by reference in their entireties.

TECHNICAL FIELD

Embodiments of this application generally relate to the terminal field, and in particular, to an activity recognition (AR) method, a display method, and an electronic device.

BACKGROUND

As a positioning technology (for example, a technology on which a global positioning system (GPS) depends) and a navigation technology (for example, a technology on which BeiDou navigation depends) develop, a mobile terminal can provide, based on a map function, a user with positioning and navigation related services. Currently, the mobile terminal can provide, based on the map function, are limited to services directly associated with a position, for example, positioning, routing, and navigation services. As a result, user experience is limited to these services.

SUMMARY

Embodiments of this application generally provide for an activity recognition method, a display method, and an electronic device, to recognize an activity state of a person and present, in a map interface, an icon representing the activity state of the person.

According to a first aspect, an embodiment of this application provides an activity recognition method, including: obtaining a plurality of poses of an electronic device in a time period; obtaining, by using a plurality of one-dimensional convolutional layers, one or more pieces of feature data based on the plurality of poses, where the one or more pieces of feature data indicate different types of information of a person (e.g., user) holding the electronic device in the time period, and a type of information indicated by each piece of feature data is a state of motion of the person, an action of the person, or a vehicle transporting the person; and instructing the electronic device to display, as an icon, the types of the information indicated by the one or more pieces of feature data.

The method is used to recognize the activity state of the person (e.g., user) holding the electronic device. The activity state of the person holding the electronic device can be represented by at least one type of information in the state of motion the person, the action of the person, or the vehicle transporting the person. The state of motion of the person is a state of the person relative to a reference system when the person performs mechanical motion. The state of motion of the person includes being at a standstill, walking, running, and the like. The action of the person includes standing, sitting, squatting, lying, and the like. The vehicle transporting the person may include any type of vehicle (for example, in-vehicle, or a high-speed train), an elevator, an escalator, It can be learned that, in some embodiments, feature extraction is performed by using the plurality of one-dimensional convolutional layers. This can increase, during feature extraction model training, a capacity of the feature extraction when compared to only depending on only one dimension of the state of motion of the person, so that an obtained feature extraction model has high scalability. This approach may also improve an accuracy of the recognized activity state of the person because the feature extraction model obtained through training can recognize the activity state of the person from a plurality of dimensions. In addition, the electronic device in some embodiments can adaptively present the activity state of the person in real time. This can optimize visual effect of the electronic device and improve use experience.

In a possible design, the obtaining, by using the plurality of one-dimensional convolutional layers, the one or more pieces of feature data based on the plurality of poses includes: obtaining a feature data group based on the plurality of poses by using the plurality of one-dimensional convolutional layers; and obtaining the one or more pieces of feature data from the feature data group. Specifically, the electronic device can perform a feature extraction on the plurality of poses, by using the plurality of one-dimensional convolutional layers, to obtain the feature data group for representing the activity state of the person. Then, the electronic device can extract, from the feature data group, feature data for representing each specific type, to obtain a specific activity of the person. This can recognize the activity state of the person from the plurality of dimensions, and improve accuracy of the recognized activity state of the person.

In a possible design, the obtaining of the feature data group based on the plurality of poses by using the plurality of one-dimensional convolutional layers includes: performing feature extraction on the plurality of poses, by using m one-dimensional convolutional layers in serial combination in a first feature extraction framework, to obtain an initial feature data group; and performing feature extraction on the initial feature data group by using n backbone models in serial combination in a second feature extraction framework, to obtain the feature data group, where each of the n backbone models includes at least two one-dimensional convolutional layers in parallel combination; and m and n each are a positive integer. The AR module includes the first feature extraction framework and the second feature extraction framework. A one-dimensional convolutional layer in each of the first feature extraction framework and the second feature extraction framework performs feature extraction, and different one-dimensional convolutional layers can extract different types of feature data. It can be learned that in some embodiments, the AR module performs feature extraction on the plurality of poses by using the stacked one-dimensional convolutional layers. This can not only extract a plurality of types of feature data groups of the person, but also results in more accurate extracted features for activity recognition after feature extraction is performed by using the plurality of one-dimensional convolutional layers.

In a possible design, the performing of the feature extraction on the plurality of poses by using the m one-dimensional convolutional layers in serial combination in the first feature extraction framework includes: performing feature extraction on a first initial feature data group, by using an $i^{th}$ one-dimensional convolutional layer in the m one-dimensional convolutional layers, to obtain a second initial feature data group, where the first initial feature data group is a feature data group obtained based on the plurality of poses by using an $(i-1)^{th}$ one-dimensional convolutional layer in the m one-dimensional convolutional layers, and i is greater than or equal to 2 and less than or equal to m. In this embodiment, the first feature extraction framework can obtain a plurality of types of feature data groups from the plurality of poses of the electronic device through serial feature extraction on the plurality of poses by using the plurality of one-dimensional convolutional layers. The plurality of types of feature data groups are for representing the activity state of the person. In actual implementation, in some embodiments, quantities of channels of the one-dimensional convolutional layers in the first feature extraction framework may increase sequentially based on a data flow direction. In some other embodiments, all or a part of quantities of channels of the one-dimensional convolutional layers in the first feature extraction framework may be the same. In some other embodiments, the quantities of channels of the one-dimensional convolutional layers in the first feature extraction framework may decrease sequentially.

In a possible design, the at least two one-dimensional convolutional layers in parallel combination in each backbone model have cores of different values. A one-dimensional convolutional layer includes a kernel (k), and a value of k indicates a quantity of consecutive data in a plurality of pieces of input data used in each convolution operation of the one-dimensional convolutional layer. Because the plurality of pieces of input data are obtained by sampling based on a time dimension, the value of k is related to a time scale. Based on this, each backbone model can perform feature extraction on input feature data group from different time scales, so as to ensure that an extracted feature data group can represent more features and cover a plurality of features corresponding to a same activity when any one of an action amplitude and an action speed is different. This improves recognition accuracy.

In a possible design, the obtaining of the one or more pieces of feature data from the feature data group includes: obtaining, based on the feature data group, a child feature data group corresponding to each of all or a part of the at least one type of information; and separately obtaining feature data with a highest level of confidence from each child feature data group, and using all feature data with the highest levels of confidence as the one or more pieces of feature data. The level of confidence indicates a trustworthiness degree of behavior corresponding to corresponding feature data. The AR module further includes a classifier. The classifier may separately obtain, from the feature data group, the child feature data group corresponding to each type, and further obtain, from each child feature data group, feature data with the highest level of confidence in the child feature data group. The feature data with the highest level of confidence indicates specific information of the type of the person, for example, a specific state of motion of the person is at a standstill. This can obtain at least one type of feature of the person, so that the activity state of the person can be represented from the plurality of dimensions.

In a possible design, after the obtaining of the feature data with the highest level of confidence from each child feature data group, the method further includes: calculating, based on each piece of feature data and a state transition matrix associated with the feature data, a probability that an activity state corresponding to the feature data is transferred to each of the other activity states, to obtain at least one probability value, and the state transition matrix includes a probability of mutual transition between any two activity states in the type of the information indicated by the feature data; and when the at least one probability value includes a value greater than a first preset threshold, using, as feature data corresponding to the type, transferred activity state data corresponding to a largest probability value in the probability value greater than the first preset threshold; or when the at least one probability value does not include a value greater than a first preset threshold, using feature data with the highest level of confidence as feature data corresponding to the type. In actual implementation, the activity state of the person can change at any time. Based on this, in some embodiments, corresponding to each type of person information, the electronic device maintains the state transition matrix in advance, and the state transition matrix includes the transition probability between any two states corresponding to the type. Further, the electronic device calculates, based on each type of feature data with the highest level of confidence and the corresponding state transition matrix, the probability that the feature data with the highest level of confidence is transferred to feature data in another state. When the probability greater than the first preset threshold exists in the obtained probability, the electronic device uses, as the feature data of the type, the transferred activity state data corresponding to the highest probability, where the feature data indicates a possible actual activity state of the user. This implementation can further improve accuracy of recognizing the activity state of the person by the electronic device.

In a possible design, the controlling the electronic device to display, as an icon, the types of the information indicated by the one or more pieces of feature data includes: instructing the electronic device to display a map, and controlling at least a part of the icon to be displayed on the map. In this implementation, the electronic device can interactively present the map and the icon of the activity state of the person. This can improve a visual effect of a map function and improve user experience.

In a possible design, the obtaining of the plurality of poses of an electronic device in a time period includes: obtaining at least one group of sensor data for representing poses of the electronic device; detecting whether data loss occurs in each of the at least one group of sensor data; performing sampling and linear interpolation on at least one group of sensor data in which no data loss occurs, to obtain a plurality of pieces of sensor data; and performing filtering and gravity residual removal operations on the plurality of pieces of sensor data, to obtain the plurality of poses.

In a possible design, the sensor data includes measurement data of a gyroscope sensor, measurement data of an acceleration sensor, and measurement data of a magnetic sensor.

According to a second aspect, an embodiment of this application provides a display method, including: receiving a first operation instruction; and displaying, in a map interface in response to the first operation instruction, an icon representing an activity state of a person, where the activity state of the person indicates one or more types of the following information: a state of motion of the person, an action of the person, and a vehicle transporting the person.

The icon in some embodiments may include at least one of a person icon or an object icon. In some embodiments, the icon is a static image in an image format including a jpg format, a tif format, an img format, or the like. In other embodiments, the icon is a dynamic image in an image format including a gif format. In some embodiments, the electronic device displays a map, and the icon is displayed on the map. It can be learned that, in this implementation of some embodiments, the activity state of the person and the map can be presented interactively, so that the electronic device can adaptively present the activity state of the person in real time in the map interface. This improves a visual effect of a map function and improves user experience.

In a possible design, the displaying, in the map interface in response to the first operation instruction, the icon representing the activity state of the person includes: displaying the icon in a floating manner in a window in the map interface.

In a possible design, the displaying, in the map interface in response to the first operation instruction, the icon representing the activity state of the person includes: displaying, in the map interface, the icon in a position corresponding to the person related to the icon.

According to a third aspect, an embodiment of this application provides an electronic device. The electronic device includes a processing module, a receiving module, and a display module. The processing module includes functions of performing feature data extraction, classification, and display control in the first aspect, the second aspect, the various possible implementations of the first aspect, and the various possible implementations of the second aspect. The receiving module is configured to receive an operation instruction and sensor data in the first aspect, the second aspect, the various possible implementations of the first aspect, and the various possible implementations of the second aspect. The display module is configured to perform a function such as displaying an icon in the first aspect, the second aspect, the various possible implementations of the first aspect, and the various possible implementations of the second aspect.

According to a fourth aspect, an embodiment of this application provides an electronic device. The electronic device has a function of implementing one or more of the methods in the first aspect, the second aspect, the various possible implementations of the first aspect, and the various possible implementations of the second aspect. The function may be implemented by hardware, or may be implemented by hardware executing corresponding software. The hardware or the software includes one or more modules corresponding to the foregoing function. In a possible design, a structure of the electronic device includes a processor, a receiver, and a display. The processor is configured to perform all of the functions with the possible exception of sending, receiving, and displaying information in the foregoing method. The receiver is configured to receive a user operation instruction. The display is configured to display a map and an icon. The electronic device may further include a memory. The memory is configured to be coupled to the processor, and the memory stores program instructions and data that are necessary for the electronic device.

According to a fifth aspect, an embodiment of this application provides a computer storage medium. The computer storage medium stores instructions. When the instructions are run on a computer, the computer is enabled to perform some or all steps of the method in the first aspect, the second aspect, the various possible implementations of the first aspect, and the various possible implementations of the second aspect.

According to a sixth aspect, an embodiment of this application provides a computer program product. When the computer program product runs (e.g., is executed) on a computer, the computer is enabled to perform some or all steps of the method in the first aspect, the second aspect, the various possible implementations of the first aspect, and the various possible implementations of the second aspect.

It can be learned that the AR module running in the electronic device in embodiments of this application extracts, from the poses of the electronic device by using the stacked one-dimensional convolutional layers, the feature data for representing the activity state of the person. This implementation not only has high scalability, but also ensures that the extracted feature data indicates at least one type of person information. This results in a more detailed and accurate representation of the activity state of the person. In addition, the AR module in the electronic device interacts with the map function, so that the electronic device can adaptively present the activity state of the person in real time in the map interface. This can optimize a visual effect of the map function and improve user experience.

DESCRIPTION OF EMBODIMENTS

Figure 1A:
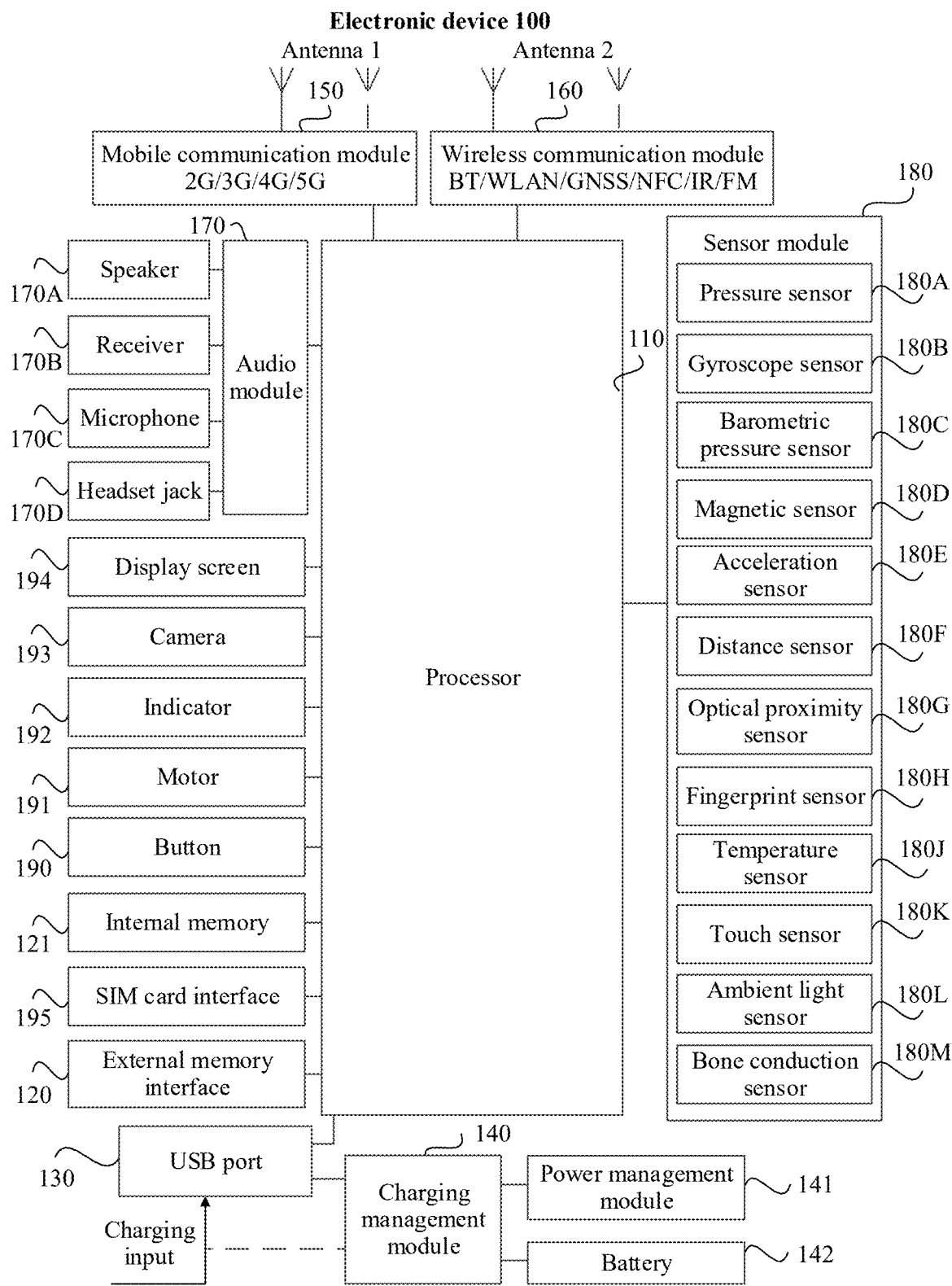
FIG. 1A is a schematic diagram of an example of a hardware structure of an electronic device 100 according to an embodiment of this application.

The following disclosure describes the technical solutions in embodiments of this application with reference to the accompanying drawings of the embodiments of this application.

Terms used in the following embodiments of this application are merely intended to describe embodiments, but are not intended to limit this application. As used in the specification of this application and the appended claims, the singular expression "a", "an", "the", "the foregoing", "such a", or "this" is intended to also include a plural expression unless otherwise clearly indicated in the context. It should also be understood that although the terms first, second, and the like may be used to describe a class of objects in the following embodiments, the objects should not be limited to these terms. The terms are merely used to distinguish between specific objects of this class of objects. For example, in the following embodiments, the terms first, second, and the like may be used to describe an operation instruction, but the operation instruction should not be limited to these terms. These terms are only used to distinguish different operation instructions input by a user. The same applies to other classes of objects that may be described by using the terms first, second, and the like in the following embodiments, and details are not described herein again.

Embodiments of this application provide an activity recognition (AR) method and a display method. An electronic device can obtain, by using an AR module based on a one-dimensional convolution principle, an activity state of a person carrying the electronic device, and display, in a map interface, an icon related to the activity state of the person. This can enable a map function of the electronic device to dynamically present the activity state of the person in real time, and optimize user experience.

It should be noted that the "activity state of the person" in embodiments of this application refers to a state of the person represented by a motion or an action of the person, and an environmental element associated with the corresponding action. In embodiments of this application, the activity state of the person may be represented from at least one dimension, for example, the activity state of the person may be represented from at least one dimension of a state of motion of the person, an action of the person, and a vehicle transporting the person. The state of motion of the person is a state of the person relative to a reference system when the person performs mechanical motion. The state of motion of the person may include at least one of being at a standstill, walking, and running. The action of the person is a body action of the person, and may include at least one of standing, sitting, squatting, lying, and the like. The vehicle transporting the person may include any type of vehicle (for example, in-vehicle, and a high-speed railway), an elevator, an escalator, and the like taken by the person. For example, the state of motion of the person being at a "standstill", the action of the person is "sitting", and the vehicle transporting the person is a "high-speed railway". Correspondingly, the activity state of the person is, for example, the user is taking the high-speed rail. In an implementation of the activity recognition method, each of the foregoing dimensions may be expressed as one type of feature data of the person. For example, a dimension of the state of motion of the person is expressed as a first type of feature data, a dimension of the action of the person is expressed as a second type of feature data, and a dimension of the vehicle transporting the person is expressed as a third type of feature data, so that the electronic device recognizes the activity state of the person based on different types of feature data.

It should be understood that, in actual implementation, a dimension representing the activity state of the person is not limited to the foregoing example. In addition, the state of motion of the person, the action of the person, and the vehicle transporting the person are not limited to the foregoing examples and are exclusively for providing some examples of the AR method and the display method.

The following disclose describes an electronic device, a graphical user interface (UI) for such an electronic device, and embodiments for such an electronic device.

The electronic device in embodiments of this application may be a device having a posture detection function and a display function, for example, an electronic device such as a mobile phone, a tablet computer, a wearable device (for example, a watch, a band, or a helmet), a vehicle-mounted device, or an augmented reality (AR)/virtual reality (VR) device. It may be understood that a specific type of the electronic device is not limited in the embodiments of this application. The electronic device may be a device running iOS®, Android®, Microsoft®, or another operating system.

A smartphone is used as an example. FIG. TA is a schematic diagram of a hardware structure of an electronic device 100. The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in some embodiments does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units (e.g., circuits) may be independent components, or may be integrated into one or more processors. In some embodiments, the electronic device 100 may also include one or more processors 110.

The controller may be a nerve center and a command center of the electronic device 100. The controller may generate an operation control signal based on an instruction operation code and a time sequence signal, to complete a control of an instruction detection.

A memory may be disposed in the processor 110, and is configured to store instructions and data. In some embodiments, the memory in the processor 110 is a cache memory. The memory may store an instruction or data that has been used or has been cyclically used by the processor 110. If the processor 110 needs to use the instruction or the data again, the processor may directly invoke the instruction or the data from the memory. This avoids having to repeat access to the instruction or data and reduces waiting time of the processor 110, so that the efficiency of the electronic device 100 is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of listening to a sound by using a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of listening to a sound by using a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194. The MIPI interface includes a display serial interface (DSI) and the like. In some embodiments, the processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB type-C port, or the like. The USB port 130 may be configured to connect to a charger to charge the electronic device 100, or may be configured to transmit data between the electronic device 100 and a peripheral device, or may be configured to connect to a headset for playing audio through the headset. The port may be configured to connect to another electronic device such as an AR device.

It may be understood that an interface connection relationship between the modules shown in some embodiments is merely an example for description, and does not constitute a limitation on the structure of the electronic device 100. In some other embodiments, the electronic device 100 may alternatively use an interface connection manner different from an interface connection manner in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device 100. The charging management module 140 may further supply power to the electronic device 100 through the power management module 141 while charging the battery 142.

The power management module 141 is configured to be connected to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed, to improve antenna utilization. For example, the antenna 1 may be multiplexed as a diversity antenna of a wireless local area network (WLAN). In some other embodiments, the antenna may be used in combination with a tuning switch.

The mobile communication module 150 may provide a solution that is applied to the electronic device 100 and that includes wireless communication such as 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an operation interface of an app on the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a WLAN (for example, a wireless fidelity (Wi-Fi)), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

In some embodiments, the wireless communication solution provided by the mobile communication module 150 may enable the electronic device 100 to communicate with a device (such as a cloud server) in a network. The WLAN wireless communication solution provided by the wireless communication module 160 may also enable the electronic device 100 to communicate with a device (such as a cloud server) in a network.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. For example, the GPU may perform rendering to obtain an image representing an activity state of a person. The processor 110 may include one or more GPUs that execute program instructions to generate a display interface of a map app. In some embodiments, the display 194 may include a display and a touch device. The display is configured to output displayed content to a user, for example, an application (APP) icon display interface of the electronic device 100, a map display interface, and a display interface for representing an activity state of a person in the map interface. The touch control device is configured to receive an operation instruction input by a user on the display 194.

The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like.

In some embodiments of this application, when the display panel is made of a material such as an OLED, an AMOLED, or an FLED, the display 194 may be bent. A bendable display facilitates for the display to be bent to any angle at any part and may be maintained at the angle. For example, the display 194 may be folded left and right in the middle, or may be folded up and down in the middle.

The electronic device 100 may implement a photographing function through the camera 193, the ISP, the video codec, the GPU, the display 194, the application processor, and the like.

The NPU is a neural-network (NN) computing processor that may quickly process input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external memory card communicates with the processor 110 through the external memory interface 120, to implement a data storage function. For example, data such as music, a photo, and a video is stored in the external storage card.

The internal memory 121 may be configured to store one or more computer programs, where the one or more computer programs include instructions. The processor 110 may run the instructions stored in the internal memory 121, so that the electronic device 100 performs the display method provided in some embodiments of this application, various data processing, and the like. The internal memory 121 may include a program storage area and a data storage area. The program storage area may store an operating system. The program storage area may further store one or more applications (such as Map, Email, and Contact), and the like. The data storage area may store data required in a use case of the electronic device 100 (for example, an algorithm for recognizing an activity state of a person, and an icon description file), and created data (such as sensor measurement data). In addition, the internal memory 121 may include a high-speed random access memory (RAM), or may include a nonvolatile memory, for example, at least one magnetic disk storage device, a flash memory, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear (i.e., the user) to listen to an output audio signal.

The microphone 170C, also referred to as a "mike" or "mic", is configured to convert an audio signal into an electrical signal. When making a call or sending a voice message, a user may make a sound near the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch position based on a detection signal of the pressure sensor 180A. In some embodiments, touch operations that are performed in a same touch position but have different touch operation intensity may correspond to different operation instructions.

The gyroscope sensor 180B may detect a pose change of the electronic device 100 by detecting rotational angles of the electronic device 100 around three axes (namely, an x-axis, a y-axis, and a z-axis), and further determine behavior of a user carrying the electronic device 100. For example, that the user is holding the electronic device 100. In a process in which the user walks up the stairs, the electronic device 100 continuously has a slight displacement with an action of the user, and the rotational angles of the electronic device 100 relative to the three axes continuously change with a body posture of the user. In this scenario, the electronic device 100 obtains measurement data of the gyroscope sensor 180B, and determines a pose change of the electronic device 100 based on the measurement data of the gyroscope sensor 180B. This can determine a posture change of the user.

The acceleration sensor 180E may detect magnitudes of accelerations of the electronic device 100 in a plurality of directions (generally an x-axis, a y-axis, and a z-axis), determine an activity direction of the electronic device 100, and determine a behavior action of the user carrying the electronic device 100. For example, that the user is holding the electronic device 100. In a process in which the user walks upstairs, the electronic device 100 may obtain accelerations (namely, measurement data of the acceleration sensor 180E) detected by the acceleration sensor 180E in the x-axis, y-axis, and z-axis directions, and then determine an activity direction of the electronic device 100 based on the measurement data of the acceleration sensor 180E and further determine the behavior of the user.

The magnetic sensor 180D may include a Hall effect sensor. The magnetic sensor 180D may determine an orientation of the display 194 by detecting a magnitude and a direction of a magnetic field. For example, the electronic device 100 may determine, based on the magnetic sensor 180D, that the display 194 is parallel to the ground and the display 194 faces upward. Further, the electronic device 100 may correctly mark an icon or the like in an interface of a map app based on the orientation of the display 194. In some embodiments, when the electronic device 100 is a flexible screen device, the electronic device 100 may detect a folded state and an unfolded state of a screen based on the magnetic sensor 180D. Details are not described herein again.

For ease of description, in a subsequent embodiment of this specification, data detected by the gyroscope sensor 180B, for example, a rotation angle of a gyroscope, is referred to as "measurement data of the gyroscope sensor 180B"; data detected by the acceleration sensor 180E, for example, a magnitude and a direction of gravity, is referred to as "measurement data of the acceleration sensor 180E"; and data detected by the magnetic sensor 180D, for example, a magnitude and a direction of a magnetic field, is referred to as "measurement data of the magnetic sensor 180D". The measurement data of the gyroscope sensor 180B, the measurement data of the acceleration sensor 180E, and the measurement data of the magnetic sensor 180D may reflect the pose change of the electronic device 100, the measurement data of the acceleration sensor 180E may reflect a moving speed of the electronic device 100, and the like. Therefore, the activity state of the user carrying the electronic device 100 can be determined.

The barometric pressure sensor 180C is configured to measure barometric pressure. In some embodiments, the electronic device 100 calculates an altitude through the barometric pressure measured by the barometric pressure sensor 180C, to assist in positioning and navigation.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there isn't an object near the electronic device 100. The electronic device 100 may detect, by using the optical proximity sensor 180G, that the user is holding the electronic device 100 close to the user's ear for a call and to automatically turn off the screen of the electronic device 100 to save power. The optical proximity sensor 180G may also be used in a smart cover mode or a pocket mode to automatically allow for the screen to be unlocked or locked.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance when the user is capturing a photo or video with a camera of the electronic device 100. The ambient light sensor 180L may also cooperate with the optical proximity sensor 180G to detect whether the electronic device 100 is in a user's pocket to avoid accidently triggering the phone when not in use.

The fingerprint sensor 180H is configured to collect a fingerprint of the user. The electronic device 100 may use the feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by considering the temperature detected by the temperature sensor 180J. For example, when the temperature reported by the temperature sensor 180J exceeds a first threshold, the electronic device 100 lowers the performance of a processor near to the temperature sensor 180J to reduce its power consumption, and therefor provide for thermal protection. In some other embodiments, when the temperature is less than a second threshold, the electronic device 100 heats the battery 142 to prevent the electronic device 100 from being shut down abnormally due to a low environmental temperature. In some other embodiments, when the temperature is lower than a third threshold, the electronic device 100 boosts an output voltage of the battery 142 to avoid abnormal shutdown caused by a low temperature.

The touch sensor 180K may also be referred to as a touch panel or a touch-sensitive surface. The touch sensor 180K may be disposed on the display 194, and the touch sensor 180K and the display 194 form a touchscreen, which is also referred to as a "touch control screen". The touch sensor 180K is configured to detect a touch operation performed by the user on or near the touch sensor. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part of the user. The bone conduction sensor 180M may also be in contact with a body pulse to receive a blood pressure beating signal from the user. In some embodiments, the bone conduction sensor 180M may also be disposed in a headset, to obtain the blood pressure beating signal from the headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effect. The motor 191 may also correspond to different vibration feedback effect for touch operations performed on different areas of the display 194. Different application scenarios (for example, a time reminder, information receiving, an alarm clock, and a game) may also correspond to different vibration feedback effect. Touch vibration feedback effect may be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In some embodiments, an Android system with a layered architecture is used as an example to describe a software structure of the electronic device 100.

Figure 1B:
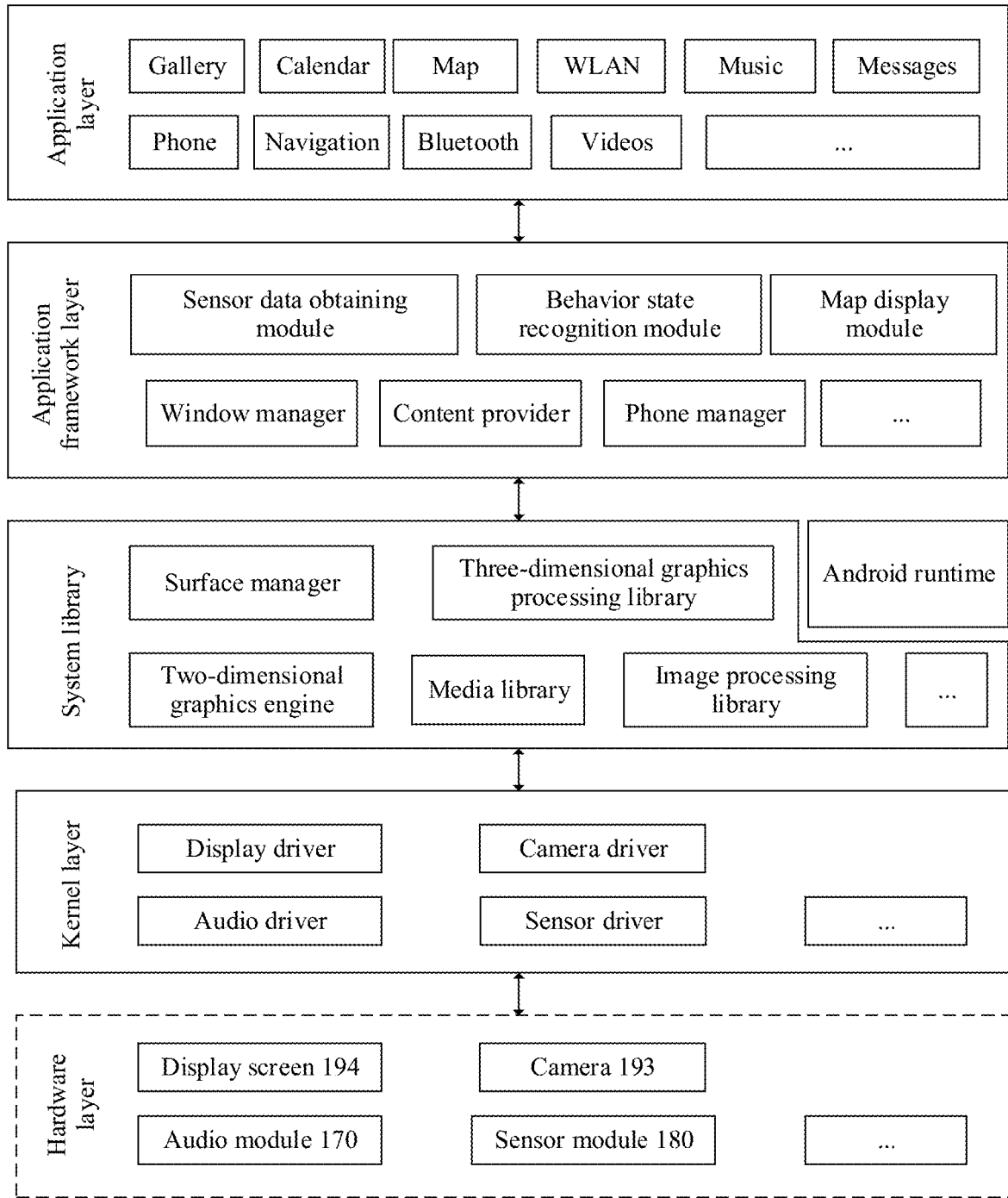
FIG. 1B is a schematic diagram of an example of a software architecture of an electronic device 100 according to an embodiment of this application.

FIG. 1B is a schematic diagram of the software structure of the electronic device 100 according to some embodiments.

In the layered architecture, software is divided into several layers, and each layer has a clear role and task. The layers communicate with each other through a software interface. In some embodiments, the Android system is divided into an application layer, an application framework layer, an Android runtime and system library, and a kernel layer from top to bottom.

The application layer may include a series of application packages.

As shown in FIG. 1B, the application packages may include applications such as Gallery, Calendar, Map, WLAN, Music, Messages, Phone, Navigation, Bluetooth, and Videos.

The application framework layer provides an application programming interface (API) and a programming framework for an application at the application layer. The application framework layer includes some predefined functions.

As shown in FIG. 1B, the application framework layer may include a sensor data obtaining module, an AR module, and a map display module. Certainly, the application framework layer may further include a window manager, a content provider, a view system, a phone manager, a resource manager, a notification manager, and the like. This is not limited in some embodiments.

The sensor data obtaining module may be configured to: obtain sensor data that reflects a posture of the electronic device 100, and transmit the obtained sensor data to the AR module. The sensor data includes, for example, the measurement data of the gyroscope sensor 180B, the measurement data of the acceleration sensor 180E, and the measurement data of the magnetic sensor 180D. In actual implementation, the sensor data obtaining module may obtain measurement data of at least one sensor so as to obtain at least one group of measurement data. It should be noted that different sensors have different detection periods. Further, the sensor data obtaining module may obtain measurement data of a sensor based on a detection period of the corresponding sensor. Therefore, the sensor data obtaining module obtains measurement data of each sensor at different frequencies. For example, the sensor data obtaining module obtains the measurement data of the magnetic sensor 180D at a frequency of 500 Hz, and the sensor data obtaining module obtains the measurement data of the acceleration sensor 180E at a frequency of 200 Hz.

It may be understood that the measurement data of the gyroscope sensor 180B, the measurement data of the acceleration sensor 180E, and the measurement data of the magnetic sensor 180D are merely example descriptions, and the sensor data in some embodiments is not limited. In some other embodiments, the sensor data may further include more or less sensor measurement data that can represent the posture of the electronic device 100.

The AR module may be configured to obtain data of an activity state of a person based on the sensor data, and transmit the data of the activity state of the person to the map display module. The AR module may include a data preprocessing module, a feature extraction module, and a classification module (neither component is shown in FIG. 1B). The data preprocessing module may be configured to pre-process sensor data; the feature extraction module may be configured to perform feature extraction on preprocessed data, so as to obtain a feature data group for representing an activity state of a person; and the classification module may be configured to extract at least one type of feature data from the feature data group, where each piece of feature data is data of the activity state of the person at one dimension. In some embodiments, both the feature extraction module and the classification module implement related functions based on a one-dimensional convolution algorithm principle. For details, refer to the following descriptions. In some embodiments, a model for implementing a function of the feature extraction module is also referred to as a time series embedding (TSE) model, and the classification module may also be referred to as a classifier. This is not limited in some embodiments.

The map display module may be configured to manage a display policy of a map function of the electronic device 100, including determining a display mode of an icon, determining a display position of the icon, and the like. The map display module may be configured to render a to-be-displayed icon. Then, the map display module may control, by using a display driver and a surface manager in a bottom-layer display system, the map app to display, on the display 194 of the electronic device 100 according to a display policy, the icon representing the activity state of the person, and present a visualized behavior state (display effect shown in FIG. 3B to FIG. 3E) to the user.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views, for example, a display interface including a camera icon.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification information may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an alert sound is played, the electronic device 100 vibrates, or the indicator light blinks.

The Android runtime includes a core library and a virtual machine. The Android runtime is responsible for scheduling and management of the Android system.

The kernel library includes two parts: a function that needs to be called in Java language and a kernel library of Android.

Still refer to FIG. 1B. The system library, the kernel layer, and the like below the application framework layer may be referred to as an underlying system. The underlying system includes an underlying display system configured to provide a display service. For example, the underlying display system includes a display driver at the kernel layer, a surface manager in the system library, and the like.

The system library may include a plurality of functional modules, for example, a surface manager, a media library, a three-dimensional (3D) graphics processing library (for example, OpenGL ES), and a 2D graphics engine (for example, SGL).

The surface manager is configured to manage a display subsystem and provide a fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least one of a display driver, a camera driver, an audio driver, or a sensor driver.

A UI for implementing a display function in embodiments of this application is a medium interface for interaction and information exchange between an application or an operating system and a user, and implements conversion between an internal form of information and a form acceptable to the user. A user interface of an application is source code written in a specific computer language, for example, Java or an extensible markup language (eXML). The interface source code is parsed and rendered on an electronic device, and is finally presented as content that can be identified by the user, for example, a control such as a video, a picture, a text, or a button. The control, also referred to as a widget, is a basic element on the user interface. Typical controls include a toolbar, a menu bar, a text box, a button, a scrollbar, a picture, and a text. An attribute and content of a control on an interface are defined by using a tag or a node. For example, the control included in the interface is defined in the XML by using a node, for example, <Textview>, <ImgView>, or <VideoView>. One node corresponds to one control or one attribute on the interface. After being parsed and rendered, the node is presented as user-visible content. In addition, interfaces of many applications such as a hybrid application typically further include a web page. A web page, also referred to as a page, may be understood as a special control embedded in an interface of an application. A web page is source code written in a specific computer language, for example, a hypertext markup language (HTML), cascading style sheets (CSS), or JavaScript (JS). The web page source code may be loaded and displayed as user-recognizable content by a browser or a web page display component with a function similar to a function of the browser. Specific content included in the web page is also defined by using a tag or a node in the web page source code. For example, an element and an attribute of the web page are defined in the HTML by using <p>, <img> <video>, or <canvas>.

The user interface is usually represented in a form of a graphical user interface (GUI), and is a user interface that is related to a computer operation and that is displayed in a graphic manner. The user interface may be an interface element such as an icon, a window, or a control displayed on a display of an electronic device, and the control may include a visual interface element such as an icon, a button, a menu, a tab, a text box, a dialog box, a status bar, a navigation bar, or a widget.

In some existing implementations, the electronic device may not have a function of detecting an activity state of a person, or the electronic device has a function of detecting an activity state of a person, but the function of detecting the activity state of the person and a map display function are independent of each other due to there being no requirement to relate the two functions. Therefore, the electronic device cannot provide a service of displaying the activity state of the person on a map, and can only provide a service directly related to a position of a user carrying the electronic device. As a result, the map function has a single associated service item, resulting in a limited user experience.

Figure 2A:
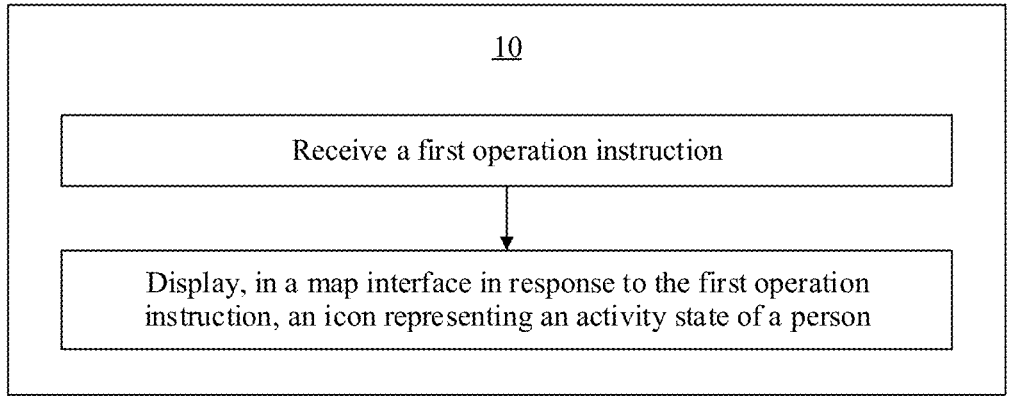
FIG. 2A is an example of a method flowchart of a display method 10 according to an embodiment of this application.

Based on this, as shown in FIG. 2A, an embodiment of this application provides a display method 10. The display method 10 includes that the electronic device 100 receives a first operation instruction, and then the electronic device 100 displays, in a map interface in response to the first operation instruction, an icon representing an activity state of a person.

Figure 3A:
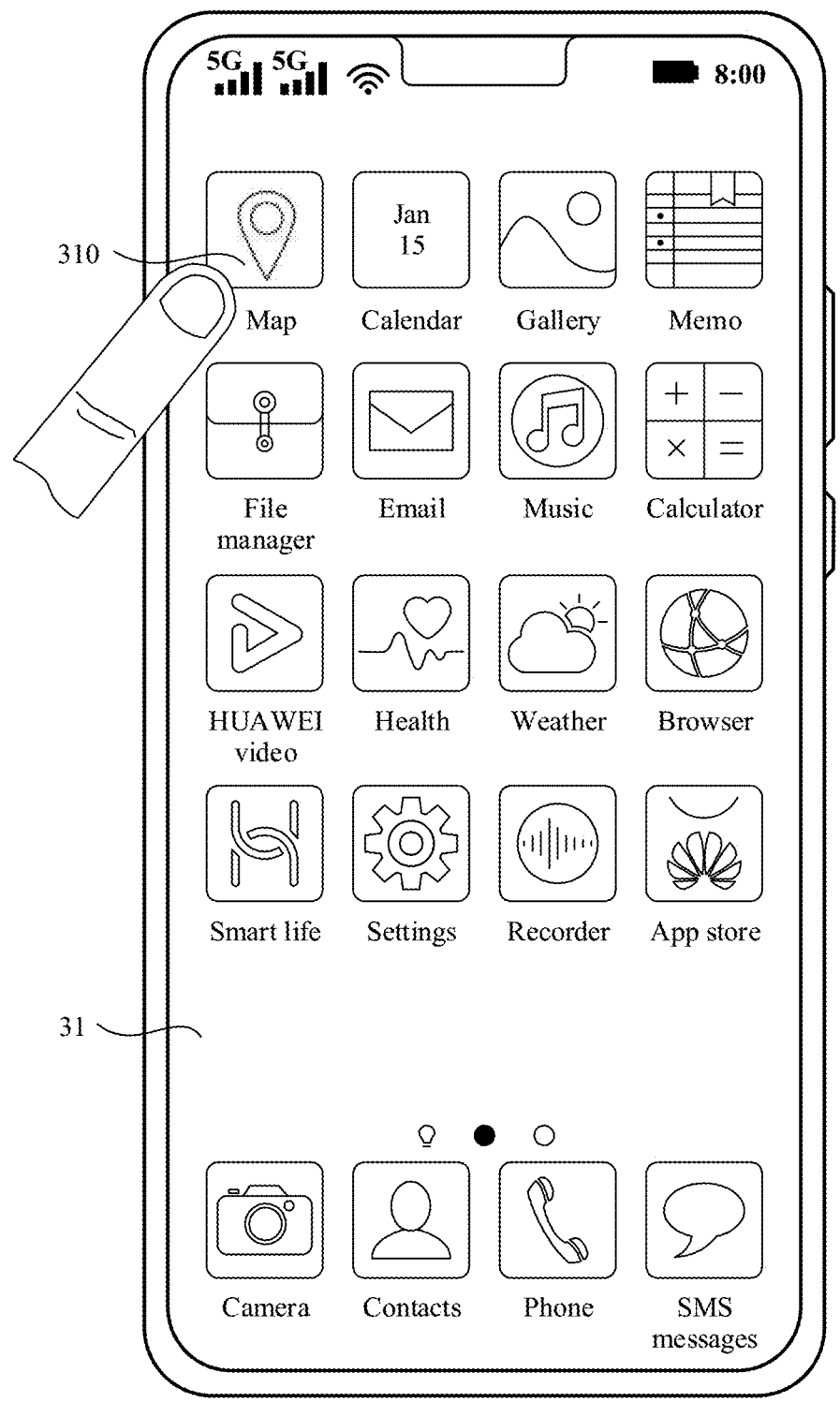
FIG. 3A is a schematic diagram of an example interface of a home interface of a mobile phone according to an embodiment of this application.
Figure 3B:
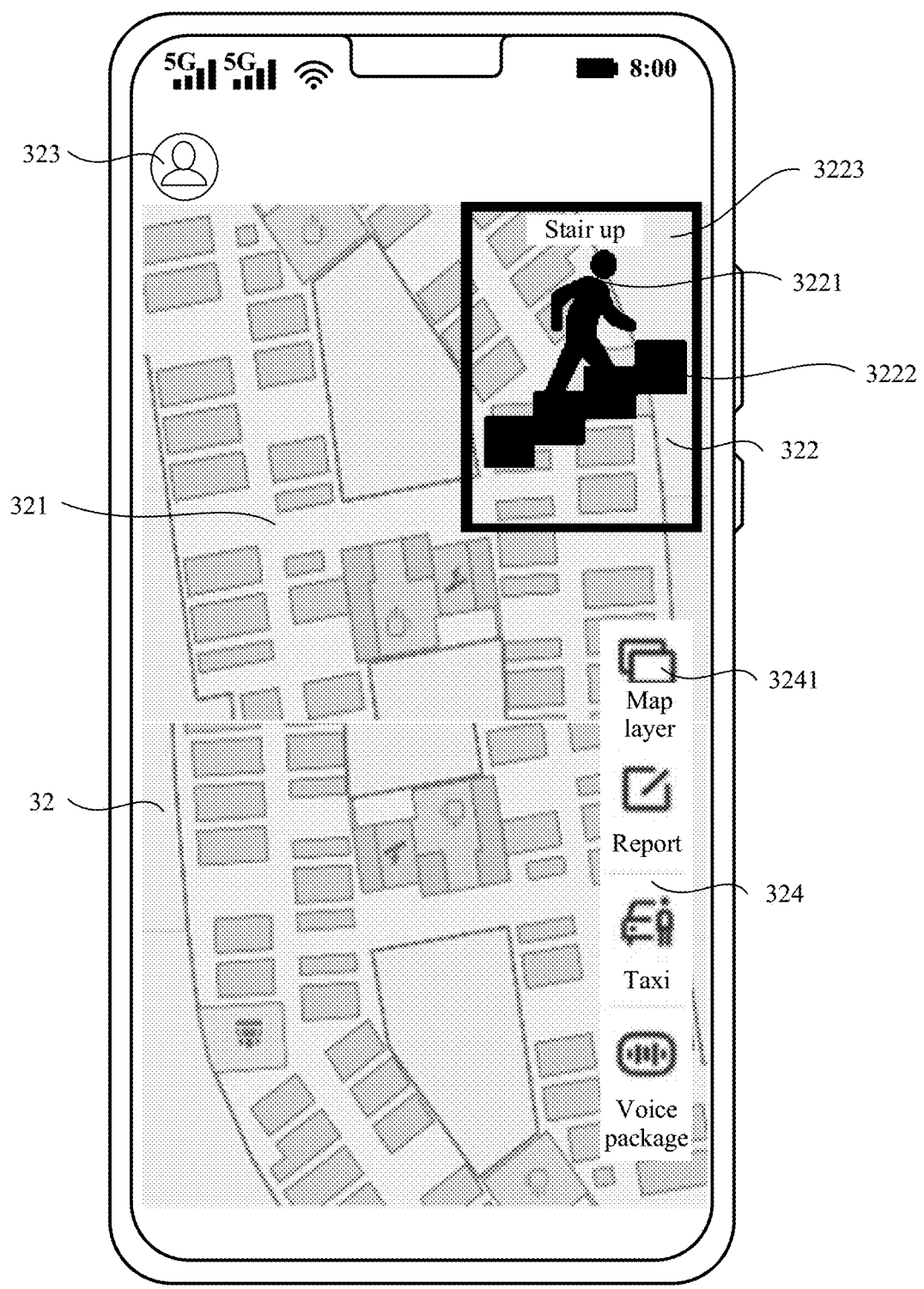
FIG. 3B is a schematic diagram of a first example interface of a map display interface according to an embodiment of this application.
Figure 3C:
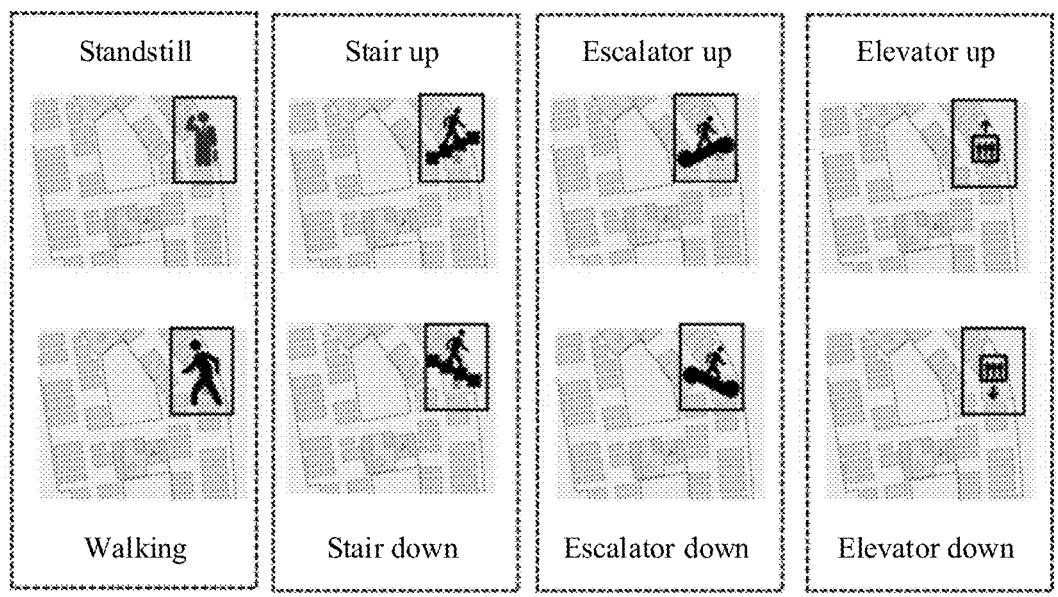
FIG. 3C is a schematic diagram of a second example interface of a map display interface according to an embodiment of this application.

In some embodiments, the icon includes a person icon, for example, a person vector diagram (an icon in a "walking scenario" shown in FIG. 3C). In other embodiments, the icon includes an object icon, for example, an elevator vector diagram, an escalator vector diagram, or a bicycle vector diagram. In still other embodiments, the icon includes a person icon and an object icon, and the person icon and the object icon are displayed in combination. For example, a person vector diagram is close to a staircase shown in a staircase vector diagram (an icon in a "stair up scenario" in FIG. 3C).

Figure 3D:
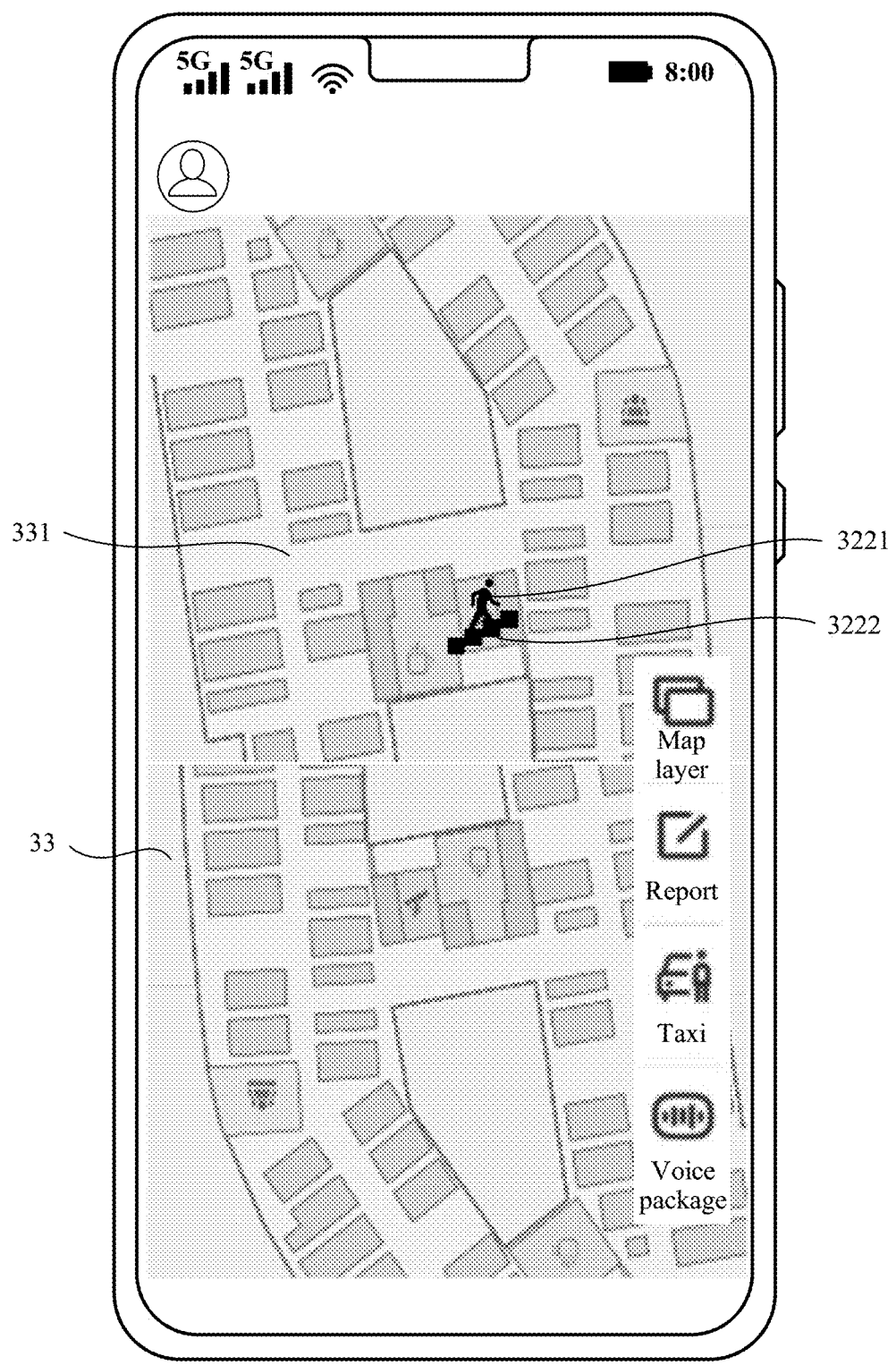
FIG. 3D is a schematic diagram of a third example interface of a map display interface according to an embodiment of this application.

In some embodiments, the icon is a static image (an icon in a "standstill scenario" in FIG. 3C) with an image format that may be a jpg format, a tif format, or an img format. In other embodiments, the icon is a dynamic image (a person icon illustrated in each of FIG. 3F and FIG. 3G) with an image format that may be a gif format. In still other embodiments, when the icon includes the person icon and the object icon, at least one of the person icon and the object icon is a dynamic image. As shown in FIG. 3D, a person icon is a dynamic image, and a stair icon is a static image. This is not limited herein.

In some other embodiments, the electronic device 100 may further present at least one display mode, and each display mode indicates a display manner of the icon in the map app interface. For example, a first display mode indicates that the icon is displayed in a floating manner in the map app interface (as shown in FIG. 3B); a second display mode indicates that the icon is embedded in the map app interface, and the map app interface is presented in a plan view (as shown in FIG. 3D); and a third display mode indicates that the icon is embedded in the map app interface, and the map app interface is presented in a sectional view. Based on this, the display method 10 may further include that the electronic device 100 receives a second operation instruction input by a user, and then the electronic device 100 displays, in a display mode indicated by the second operation instruction, the icon representing the activity state of the person.

It can be learned that, in this implementation of some embodiments, the activity state of the person and a map can be presented interactively, so that the electronic device 100 can adaptively present the activity state of the person in real time in the map interface. This optimizes a visual effect of a map function and improves user experience.

It should be noted that, in actual implementation, the map function of the electronic device 100 may be implemented on the map app installed on the electronic device 100, or may be implemented by using a map plug-in or a map applet of another app on the electronic device 100, for example, a map plug-in in an instant chat app.

Figure 2B:
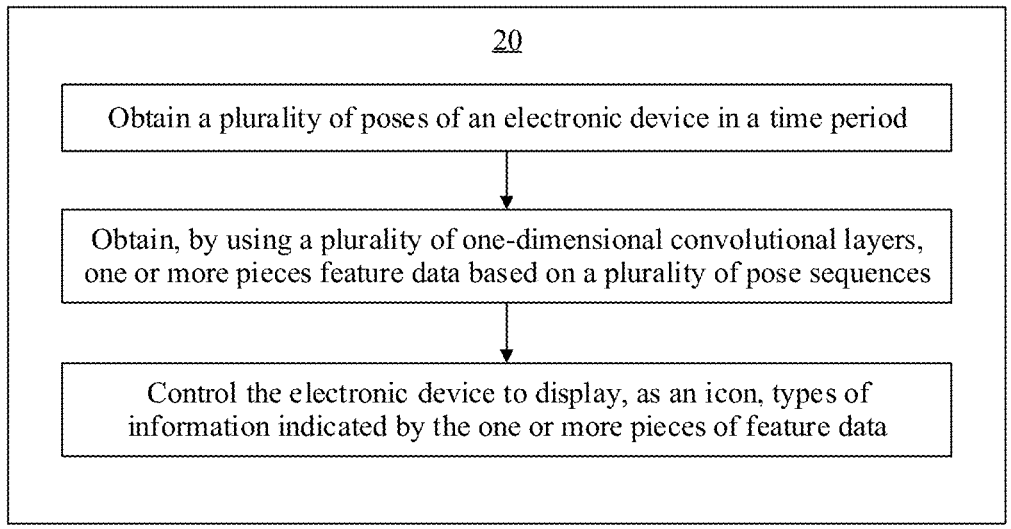
FIG. 2B is an example of a method flowchart of an activity recognition method 20 according to an embodiment of this application.

FIG. 2B shows an activity recognition method 20. In the activity recognition method 20, the electronic device 100 can obtain the icon representing the activity state of the person in the display method 10. The activity recognition method 20 may include that the electronic device 100 obtains a plurality of poses of the electronic device 100 in a time period, and then obtains one or more pieces of feature data based on the plurality of poses by using a plurality of one-dimensional convolutional layers. The one or more pieces of feature data indicate different types of information of a person holding the electronic device 100 in the time period, and a type of information indicated by each piece of feature data may be a state of motion of the person, an action of the person, or a vehicle transporting the person. Further, the electronic device 100 is configured to display, as an icon, the types of the information indicated by the one or more pieces of feature data.

For example, the electronic device 100 may display a map, and after obtaining the icon corresponding to each piece of feature data, instruct the corresponding icon to be displayed on the map, so as to implement the display function in the display method 10.

The "time period" in this embodiment may be flexibly set based on a requirement. This is not limited herein. In an optional example, the time period is, for example, 5 seconds (s).

In this embodiment, that the electronic device 100 obtains the one or more pieces of feature data based on the plurality of poses may include that the electronic device obtains a feature data group based on the plurality of poses by using the plurality of one-dimensional convolutional layers, where the feature data group includes at least one type of information of the activity state of the person. Further, the electronic device 100 obtains each of the foregoing types of feature data from the feature data group, to obtain the one or more pieces of feature data.

Figure 2C:
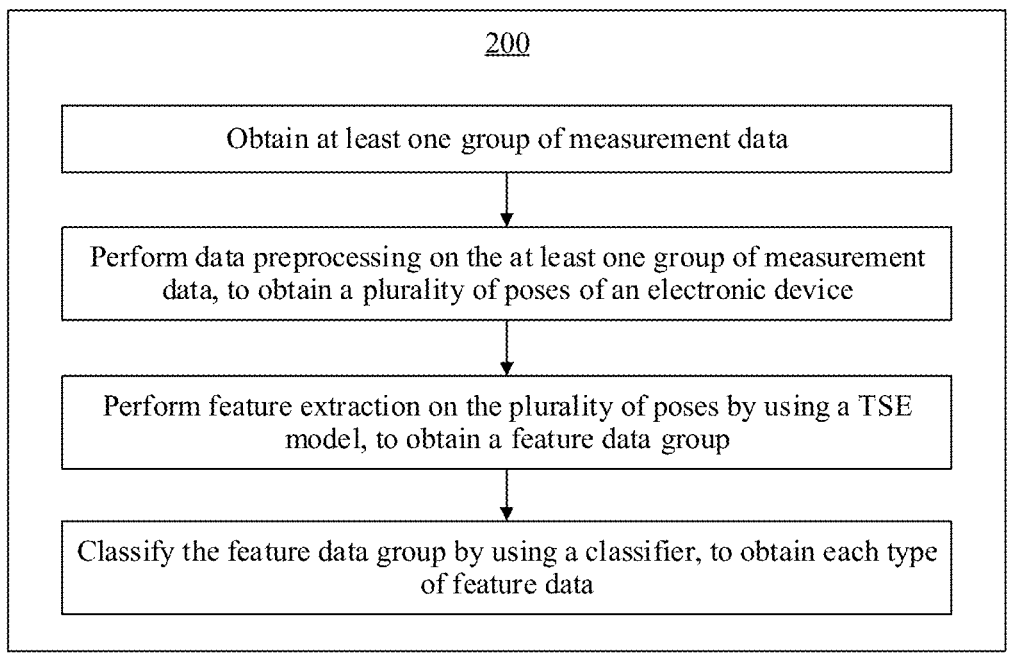
FIG. 2C is an example of a method flowchart of an activity recognition method 200 according to an embodiment of this application.

FIG. 2C shows an activity recognition method 200. The activity recognition method 200 is a possible implementation of the activity recognition method 20. The activity recognition method 200 includes that the electronic device 100 obtains at least one group of measurement data, where each group of measurement data in the at least one group of measurement data corresponds to one sensor. Further, the electronic device 100 performs data preprocessing on the at least one group of measurement data, to obtain a plurality of poses of the electronic device 100. Then, the electronic device 100 performs feature extraction on the plurality of poses by using a time series embedding (TSE) model, to obtain a feature data group. Further, the electronic device 100 performs a classification on the feature data group by using a classifier to obtain each type of feature data.

For example, that the electronic device 100 performs preprocessing on the at least one group of measurement data may include that the electronic device 100 checks each group of measurement data, to determine whether an abnormality (for example, data loss) occurs in the obtained measurement data, and then samples measurement data that passes the check (namely, measurement data on which no abnormality occurs), to unify time intervals of groups of measurement data. Then, the electronic device 100 performs linear interpolation on each group of sampled data, to obtain a group of data. Further, the electronic device 100 performs operations such as noise reduction and gravity residual removal on the obtained group of data, to obtain the plurality of poses of the electronic device 100. Then, the electronic device 100 obtains data of the activity state of the person based on the plurality of poses.

Figure 2D:
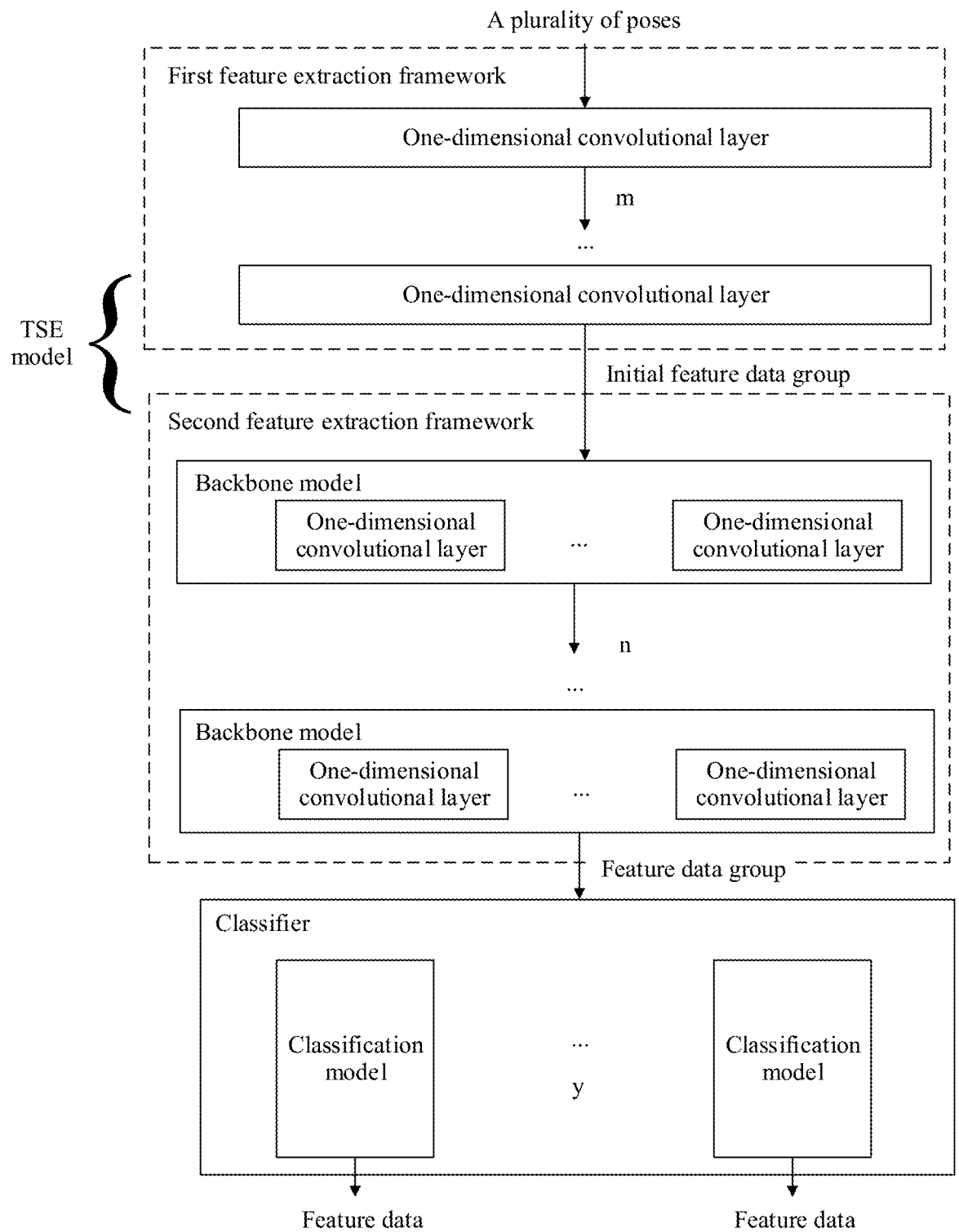
FIG. 2D is an example of an operation flow diagram of obtaining data of an activity state of a person based on a pose sequence in FIG. 2C according to an embodiment of this application.

FIG. 2D shows an example of an operation flow of obtaining the data of the activity state of the person based on the plurality of poses. The operation flow is implemented based on a TSE model and a classifier.

The TSE model in some embodiments may include a first feature extraction framework and a second feature extraction framework. The first feature extraction framework includes m one-dimensional convolutional layers in serial combination, and the second feature extraction framework includes n backbone models in serial combination. Each backbone model includes at least two one-dimensional convolutional layers in parallel combination, a quantity of one-dimensional convolutional layers in different backbone models may be the same or may be different, and m and n each are a positive integer. After the TSE model receives the plurality of poses, the first feature extraction framework performs feature extraction on the plurality of poses, to obtain an initial feature data group, and then the second feature extraction framework performs feature extraction on the initial feature data group from different time scales to obtain a feature data group associated with each time scale. Further, the classifier extracts at least one type of feature data from the feature data group, to obtain the data of the activity state of the person.

For example, a first one-dimensional convolutional layer in the first feature extraction framework receives the plurality of poses, and then the first one-dimensional convolutional layer performs feature extraction on the plurality of poses, to obtain a first initial feature data group; further, a second one-dimensional convolutional layer in the first feature extraction framework performs feature extraction on the first initial feature data group, to obtain a second initial feature data group; . . . ; and an $m^{th}$ one-dimensional convolutional layer in the first feature extraction framework performs feature extraction on a data group extracted by an $(m-1)^{th}$ one-dimensional convolutional layer so as to obtain the initial feature data group.

An operating principle of a one-dimensional convolution model is to perform feature extraction on input one-dimensional features in a quantity of channels, where a feature extracted in each channel is different from a feature extracted in another channel. Therefore, a larger quantity of channels of a convolutional layer indicates a higher accuracy of the feature extracted by the convolutional layer for the activity recognition. Based on this, in some embodiments, the quantities of channels of the one-dimensional convolutional layers in the first feature extraction framework may increase sequentially based on a data flow direction. For example, a quantity of channels of the first one-dimensional convolutional layer in the first feature extraction framework is 32, and a quantity of channels of the second one-dimensional convolutional layer in the first feature extraction framework is 64. In this way, the first feature extraction framework gradually performs deeper feature extraction on the plurality of poses, to ensure that the activity state of the person represented by the initial feature data group meets a preset condition.

Certainly, that the quantities of channels of the one-dimensional convolutional layers in the first feature extraction framework increase sequentially is merely an example implementation, and does not constitute a limitation in some embodiments. In some other embodiments, all or a part of quantities of channels of the one-dimensional convolutional layers in the first feature extraction framework may be the same. In some other embodiments, the quantities of channels of the one-dimensional convolutional layers in the first feature extraction framework may decrease sequentially. This is not limited in some embodiments.

It should be noted that the first feature extraction framework only needs to perform preliminary feature extraction on the plurality of poses. Therefore, values of kernels (k) of the m one-dimensional convolutional layers in the first feature extraction framework are the same. A value of k indicates a quantity of consecutive pose data in a plurality of poses used in each convolution operation. Further, the plurality of poses are obtained by sampling based on a time dimension. Therefore, the value of k is related to a time scale. It indicates that the initial feature data group is related to only one time scale.

In actual implementation, different people perform a same activity at different action amplitudes and action speeds, and therefore corresponding features per unit time are also different. Based on this, to ensure that the extracted feature data group can represent more features, and after obtaining the initial feature data group, the second feature extraction framework further performs feature extraction on the initial feature data group from a time scale, to obtain the feature data group.

A first backbone model in the second feature extraction framework receives the initial feature data group, and then the first backbone model performs feature extraction on the initial feature data group from a time scale, to obtain a first feature data group; further, a second backbone model in the second feature extraction framework performs feature extraction on the first feature data group from a time scale, to obtain a second feature data group; . . . ; and after an $n^{th}$ backbone model in the second feature extraction framework performs feature extraction on a data group extracted by an $(n-1)^{th}$ backbone model, the feature data group is obtained. Implementation processes of the n backbone models in the second feature extraction framework are similar. Descriptions are provided below by using a first backbone model as an example. The first backbone model is any one of the n backbone models.

For example, the first backbone model may separately input an input feature data group into at least two one-dimensional convolutional layers in the first backbone model. The at least two one-dimensional convolutional layers each perform a convolution operation on the input feature data group, and output a data group obtained through the operation. Then, the first backbone model forms data groups output by the at least two one-dimensional convolutional layers into one data group, and then outputs the data group. Values of k of the at least two one-dimensional convolutional layers in the first backbone model are different. For example, a value of k of a first one-dimensional convolutional layer in the first backbone model is 5, and a value of k of a second one-dimensional convolutional layer in the first backbone model is 9. Therefore, the two one-dimensional convolutional layers correspond to different time scales. Correspondingly, the two one-dimensional convolutional layers separately perform feature extraction on the same feature data group from two time scales, to obtain the feature data groups of a plurality of time scales.

It may be understood that for an implementation process of each of the n backbone models, refer to the implementation process of the first backbone model. Details are not described herein again.

It should be noted that the quantities of channels of at least two one-dimensional convolutional layers belonging to a same backbone model may be the same or different, and the quantities of channels of one-dimensional convolutional layers in different backbone models may also be the same or different. This is not limited in some embodiments. In addition, based on the data flow direction, the quantities of channels of one-dimensional convolutional layers in the backbone models of the second feature extraction framework may gradually increase. For example, based on the data flow direction, a quantity of channels of a one-dimensional convolutional layer in the first backbone model of the second feature extraction framework is 32, and a quantity of channels of a one-dimensional convolutional layer in the $n^{th}$ backbone model is 64.

The feature data group obtained by the TSE model includes feature data of each dimension of the activity state of the person, and there may be a plurality of pieces of feature data of each dimension. Based on this, the feature data of at least one dimension can be extracted from the feature data group in some embodiments so as to accurately obtain the specific activity of the person in the corresponding dimension.

Still refer to FIG. 2D, the classifier in some embodiments may include y classification models, where y is a positive integer. After the feature data group is input into the classifier, the y classification models each extract one type of feature data from the feature data group to obtain y types of feature data. The y types of feature data respectively represent the activity state of the person from y dimensions.

In actual implementation, any classification model may obtain a child feature data group of a type corresponding to the classification model in the feature data group based on operations of one-dimensional convolutional layers, and further obtain this type of feature data based on the obtained child feature data group.

For example, if y is 3, the classifier includes three types of classification models. A first type is used to represent the activity state of the person from a dimension of the state of motion of the person, a second type is used to represent the activity state of the person from a dimension of the action of the person, and a third type is used to represent the activity state of the person from a dimension of the vehicle transporting the person. After the feature data group is input into the classifier, the first type of classification model obtains a child feature data group for representing the state of motion of the person in the feature data group, and further obtains a first type of feature data from the obtained child feature data group, where the first type of feature data indicates the specific state of motion of the person. The second type of classification model obtains a child feature data group for representing the action of the person in the feature data group, and then obtains a second type of feature data from the obtained child feature data group, where the second type feature data indicates the specific action of the person. Likewise, a third type of classification model obtains a child feature data group for representing the vehicle transporting the person in the feature data group, and then obtains a third type of feature data from the obtained child feature data group, where the third type of feature data indicates the specific vehicle transporting the person. The first type of feature data, the second type of feature data, and the third type of feature data are the data representing the activity state of the person. In some other embodiments, y may alternatively be 1, that is, the classifier includes one type of classification model, and the classifier may obtain one type of feature data. This type may represent, for example, the activity state of the person from any dimension reflecting the state of motion of the person, the action of the person, and the vehicle transporting the person. Correspondingly, the data of the activity state of the person in this embodiment includes only one piece of feature data. Details are not described herein.

It should be noted that, in some embodiments, the electronic device 100 may directly use the feature data output by the classifier as the data to represent the activity state of the person. In some other embodiments, the electronic device 100 may perform smoothing processing on the feature data output by the classifier to obtain a possible actual activity state of the user, and further use the data obtained after smoothing processing as the data of the activity state of the person.

It may be understood that FIG. 2D is only an example for description, and constitutes no limitation on the technical solutions of embodiments of this application. In actual implementation, a quantity of one-dimensional convolutional layers in the model may be flexibly set based on a requirement. In some other embodiments, a quantity of channels of each convolutional layer, a value of k, and a quantity of feature types corresponding to a classifier may be case dependent, and details are not described herein again. In addition, this specification does not show all the implementation scenarios to which this application is applicable. Other applicable scenarios may be implemented based on the technical ideas of this application, which also fall within the protection scope of this application.

It can be learned that, in some embodiments, the feature extraction is performed by using the stacked one-dimensional convolutional layers. This can increase, during feature extraction model (namely, the TSE model and the classifier) training, a limit of a feature depending on only one dimension of the state of motion of the person, so that an obtained feature extraction model has high scalability. This approach may also improve accuracy of the recognized activity state of the person because the feature extraction model obtained through training can recognize the activity state of the person from a plurality of dimensions.

It should be noted that, in some embodiments, the activity state of the person presented by the electronic device 100 is an activity state of a user carrying the electronic device 100. In this embodiment, the electronic device 100 performs the activity recognition method, so as to obtain the data of the activity state of the user carrying the electronic device 100, and further displays, in the map interface, the icon representing the activity state of the user. In some other embodiments, the activity state of the person presented by the electronic device 100 comes from another electronic device, and is an activity state of a user carrying the another electronic device. In this embodiment, the another electronic device performs the activity recognition method, to obtain data of the activity state of the user carrying the another electronic device, and then sends the data of the activity state of the user to the electronic device 100, so that the electronic device 100 displays in the map interface, the icon representing the activity state of the corresponding user.

For ease of understanding, in the following embodiments of this application, the display method and the activity recognition method provided in embodiments of this application are described with reference to the accompanying drawings by using a mobile phone having the structures shown in FIG. 1A and FIG. 1B as an example.

For example, a map app is installed on the mobile phone. The following describes embodiments of this application by using an example in which the mobile phone recognizes an activity state of a user carrying the mobile phone (referred to as a user) and displays, in a map app interface, the activity state of the user carrying the mobile phone.

Embodiment 1

Before implementing the display method in embodiments of this application, the mobile phone receives, for example, an operation instruction input by the user to run the map app. As shown in FIG. 3A, a GUI 31 shown in FIG. 3A is an example of a display interface of a desktop of the mobile phone. The GUI 31 includes a navigation bar, a status bar, and interface elements of apps. For example, the mobile phone includes apps such as Map 310, Email, Wallet, and Smart life. After receiving the operation instruction from the user tapping the Map 310 icon, the mobile phone runs Map 310 in response to this operation instruction. The GUI 31 shown in FIG. 3A is updated to a GUI 32 shown in FIG. 3B.

As shown in FIG. 3B, the GUI 32 shown in FIG. 3B is an example of a display interface of a main interface of Map 310. The GUI 32 includes a map interface 321, an icon interface 322, a personal center interface 323, a shortcut function trigger control 324, and the like. The map interface 321 may be a map interface centered on a position of the user. The icon interface 322 includes an icon 3221 representing a person, an icon 3222 representing a stair, and an identifier 3223. The icon 3221 may be, for example, a dynamic stair-up form (not shown in the figure). The identifier 3223 indicates an activity state represented in the icon interface 322. In this embodiment, content of the identifier 3223 is "Stair-up" (e.g., a user going up the stairs), and indicates that the icon interface 322 indicates that the activity state of the person is "Stair-up". The map interface 321 and the icon interface 322 may be displayed in two layers. The map interface 321 is displayed in a main interface of the mobile phone, and the icon interface 322 is displayed in a floating manner in a small window in an upper right corner of the mobile phone. The personal center interface 323 provides the user with a main interface for entering an item such as a function setting of the map app, and further presents an entry for each function setting to the user. For example, the user may enter a personal center interface through the personal center interface 323, and may view a setting entry. Then, the user enters a setting main interface from the setting entry, and selects a display mode of the icon interface 322. For details, refer to descriptions in embodiments corresponding to FIG. 5A to FIG. 5C. Details are not described herein. The shortcut function trigger control 324 includes an entry for triggering a shortcut function, for example, an entry for a shortcut function such as Map layer 3241, Report, Taxi, or Voice package. The user can enter a corresponding function setting interface through a corresponding entry. For example, the user may enter, through Map layer 3241, an interface for setting whether the icon interface 322 is displayed. For details, refer to descriptions in an embodiment corresponding to FIG. 6. Details are not described herein again.

It should be noted that the GUI 32 shown in FIG. 3B is merely an example of presentation. In actual implementation, the mobile phone may receive an instruction that is input by the user and that is of dragging a small window corresponding to the icon interface 322. Further, the mobile phone may move, in response to the drag instruction by the user, a position of the small window corresponding to the icon interface 322. For example, the mobile phone may move, in response to the drag instruction, the small window corresponding to the icon interface 322 to an upper left corner of the interface of the mobile phone.

It may be understood that the icon interface 322 shown in FIG. 3B is merely an example of presentation, and constitutes no limitation on some embodiments. In some embodiments, the icon interface displayed on the mobile phone is associated with an actual activity of the user. For example, FIG. 3C shows eight icon interfaces and identifiers of activity states of the icon interfaces. The activity states of a person represented by the eight icon interfaces are indicated by the identifiers of the activity states corresponding icon interfaces, and details are not described herein.

In some other embodiments, after tapping Map 310 by the user is received, an icon of the activity state of the person may be associated with a position of the user. An example of a display effect in a corresponding embodiment is shown in a GUI 33 shown in FIG. 3D. Details are not described herein.

The icons shown in FIG. 3B and FIG. 3C are the display effect presented by an interaction between an AR module and a map display module in the mobile phone after the AR module in the mobile phone recognizes the activity state of the user. It can be learned that, in this implementation, the AR module in the mobile phone can interact with a map display function so that the mobile phone can recognize the activity state of the user in real time, and adaptively display, in the map interface, the icon representing the activity state of the person. This can enrich the display effect of the map interface, and improve user experience.

After receiving the operation instruction (e.g., tapping Map 310 by the user), the mobile phone recognizes the activity state of the user, and displays the icon interface 322 representing the activity state of the user.

Figure 4:
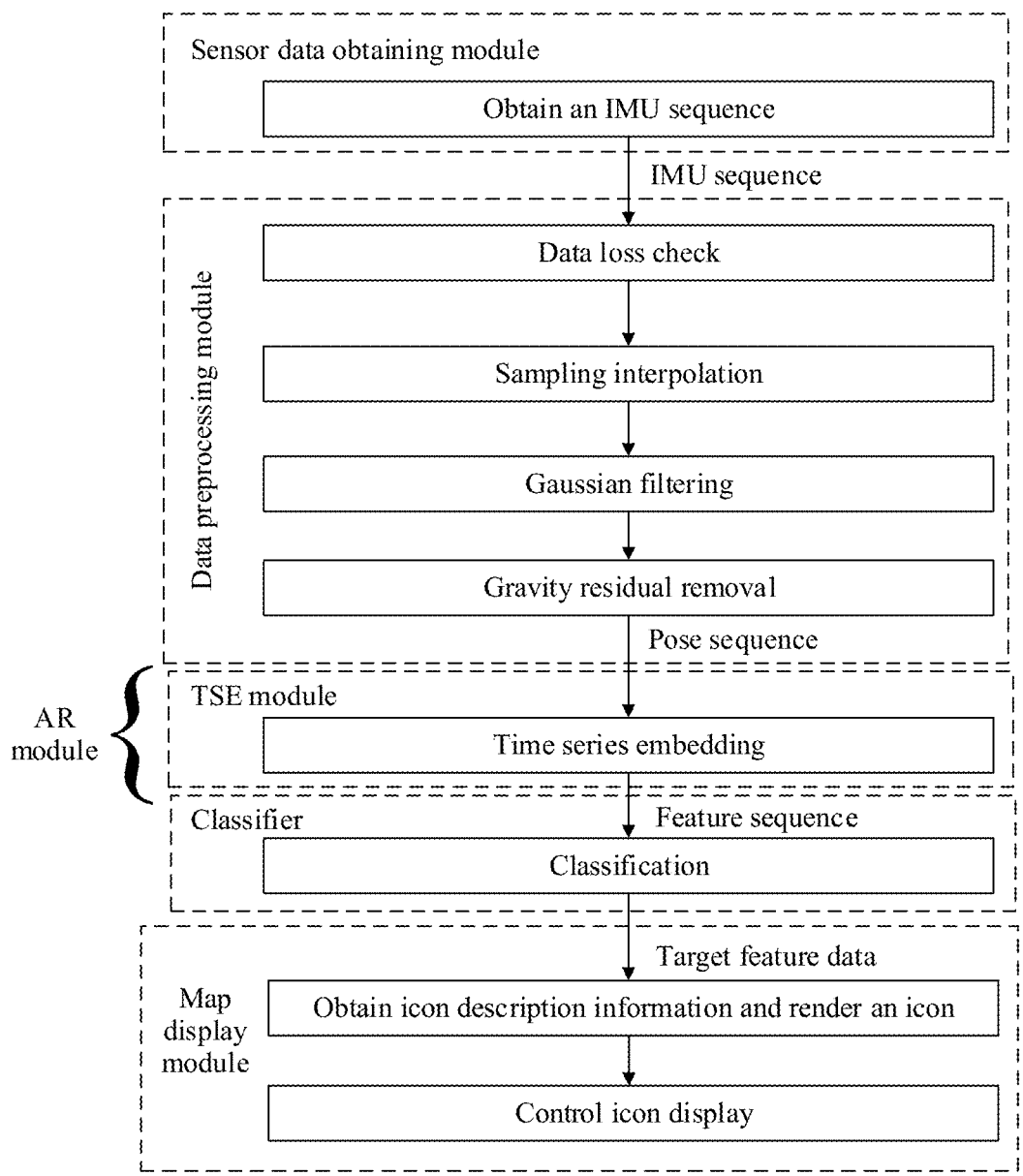
FIG. 4 is a schematic diagram of a data flow direction of a mobile phone according to an embodiment of this application.

In a data flow diagram shown in FIG. 4, after receiving the operation instruction (e.g., tapping Map 310 by the user), a sensor data obtaining module in the mobile phone obtains measurement data, for example, measurement data of a gyroscope sensor, measurement data of an acceleration sensor, and measurement data of a magnetic sensor, and then transmits the measurement data to an AR module in the mobile phone. The mobile phone may perform sampling at a frequency at which each sensor detects measurement data to obtain each piece of measurement data. For example, the sensor data obtaining module in the mobile phone performs sampling at a frequency of 500 Hz to obtain the measurement data of the gyroscope sensor, performs sampling at a frequency of 400 Hz, to obtain the measurement data of the acceleration sensor, and performs sampling at a frequency of 200 Hz, to obtain the measurement data of the magnetic sensor.

In some embodiments, measurement data of each sensor may be referred to as an inertial measurement unit (IMU) sequence. Specifically, measurement data of each sensor may be referred to as a group of IMU sequences. Hereinafter, a term "IMU sequence" is used for description. In this embodiment, a "sequence" refers to a plurality of pieces of data arranged in a chronological order.

The AR module in the mobile phone may include three functional modules: a data preprocessing module, a TSE model, and a classifier. The following describes an activity recognition procedure of the AR module with reference to the three functional modules.

Still refer to FIG. 4, the data preprocessing module in the AR module receives each group of IMU sequences, and then sequentially performs operations such as data loss check, sampling interpolation, Gaussian filtering, and gravity residual removal on each group of IMU sequences.

Data loss check is implemented as follows: for each group of IMU sequences, the data preprocessing module may detect whether a time difference between two adjacent pieces of data in the IMU sequence is greater than 50 milliseconds (ms); and if the time difference between any two adjacent pieces of data is not greater than 50 ms, it indicates that no data loss has occurred in the IMU sequence, and the data preprocessing module may perform a subsequent operation on the IMU sequence; or if the time difference between any two adjacent piece of data is greater than 50 ms, the data preprocessing module determines that a data loss occurs in the IMU sequence, and no longer performs an operation on the IMU sequence.

Sampling interpolation is implemented as follows: the data preprocessing module separately performs, at a frequency of 1000 Hz, upsampling on each group of IMU sequences on which no data loss occurs in a preset time window, and then performs, at a frequency of 100 Hz, downsampling on a sequence measured by upsampling, to align time of each group of asynchronous IMU sequences. Then, data of each sequence obtained by downsampling is linearly interpolated to obtain a time sequence. The preset time window may be, for example, 1 second (s) to 2 s.

Gaussian filtering is implemented as follows: the data preprocessing module smooths the time sequence by using a Gaussian filter to filter out noise in the time sequence. For example, a time smoothing factor of the Gaussian filter may be set to 10, that is, a bandwidth parameter of a time kernel function is set to 10.

Gravity residual removal is implemented as follows: the data preprocessing module separately obtains gravity acceleration amplitudes in x-axis, y-axis, and z-axis directions of a filtered time sequence, and then separately removes gravity in the corresponding directions based on the gravity acceleration amplitudes in the directions to obtain a pose sequence of the mobile phone.

Further, the data preprocessing module transmits the pose sequence to the TSE model in the AR module, where the TSE model obtains the feature sequence based on the pose sequence by using a plurality of one-dimensional convolutional layers.

Figure 4A:
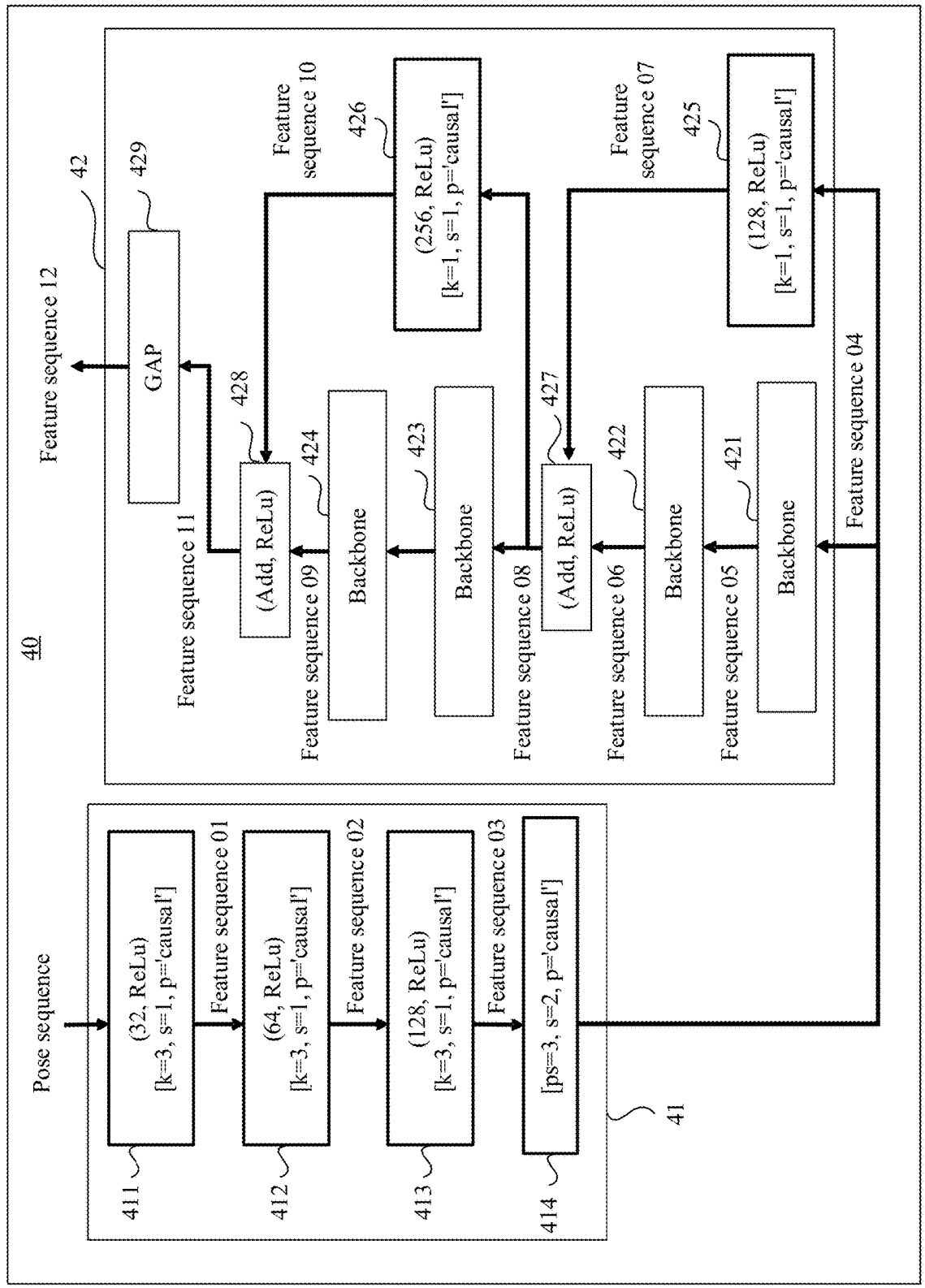
FIG. 4A is a schematic diagram of an example of an operation flow of a time series embedding (TSE) model 40 according to an embodiment of this application.

FIG. 4A shows an operation flow of a TSE model 40. As shown in FIG. 4A, a feature extraction framework 41 in the TSE model 40 includes a one-dimensional convolutional layer 411, a one-dimensional convolutional layer 412, a one-dimensional convolutional layer 413, and a data screening module 414. A feature extraction framework 42 includes a backbone model 421, a backbone model 422, a backbone model 423, a backbone model 424, a one-dimensional convolutional layer 425, a one-dimensional convolutional layer 426, a linear computation module 427, a linear computation module 428, and a global average pooling (GAP) layer 429.

Values of k in the one-dimensional convolutional layer 411, the one-dimensional convolutional layer 412, and the one-dimensional convolutional layer 413 are set to 3, and steps (steps, s) are set to 1. A quantity of channels of the one-dimensional convolutional layer 411 is 32, a quantity of channels of the one-dimensional convolutional layer 412 is 64, and a quantity of channels of the one-dimensional convolutional layer 413 is 128. A pooling window length (e.g., pooling size, ps) of the data screening module 414 is set to 3, and s is set to 2. Values of k in the one-dimensional convolutional layer 425 and the one-dimensional convolutional layer 426 are set to 1, and values of s are set to 1. In addition, a total quantities of channels of one-dimensional convolutional layers in parallel combination in the backbone model 421 are the same as a total quantities of channels of one-dimensional convolutional layers in parallel combination in the backbone model 422, for example, both are 128. The total quantities of channels of one-dimensional convolutional layer in parallel combination in the backbone model 423 are the same as the total quantities of channels of one-dimensional convolutional layers in parallel combination in the backbone model 424, for example, both are 256.

It should be noted that a value of s indicates a quantity of data that slides backward when data in the sequence is obtained in an operation process. For example, if a sequence is "001101100101010" and k is 3, it indicates that three consecutive pieces of data in the sequence are obtained each time. When s is 1 and obtained first group of operation data is "001", one piece of data slides backward on the basis of the first group of operation data, and then a second group of operational data is obtained. In this example, the second group of operation data is "011". If s is 2, two pieces of data slide backward on the basis of the first group of operation data, and then a second group of operation data is obtained. Correspondingly, the second group of operation data is "110".

After receiving the pose sequence transmitted by the data preprocessing module, the one-dimensional convolutional layer 411 performs feature extraction on the pose sequence from 32 angles (a quantity of channels 32) to obtain a feature sequence 01. Then, the one-dimensional convolutional layer 412 performs feature extraction on the feature sequence 01 from 64 angles (e.g., 64 channels), to obtain a feature sequence 02. The one-dimensional convolutional layer 413 performs feature extraction on the feature sequence 02 from 128 angles (e.g., 128 channels), to obtain a feature sequence 03. The feature sequence 03 is gradually extracted from the pose sequence. Generally, some feature data in the feature sequence 03 repeats each other. Based on this, the data screening module 414 performs a pooling operation on the feature sequence 03 to remove noise from the repeated feature data in the feature sequence 03 so as to obtain a feature sequence 04. The feature sequence 04 is the foregoing initial feature sequence. Then, a feature sequence 11 is input to the feature extraction framework 42 to continue feature extraction on the feature sequence 04 from a time scale in the feature extraction framework 42.

It should be noted that ps indicates a quantity of consecutive data in the feature sequence 03 obtained each time when the data screening module 414 performs the pooling operation. In this embodiment, if a value of ps is 3, it indicates that the data screening module 414 obtains three consecutive pieces of feature data from the feature sequence 03 each time to perform the pooling operation.

Further, after extending the feature sequence 04, the backbone model 421 separately performs feature extraction by using at least two one-dimensional convolutional layers to obtain a feature sequence 05. Values of k of the at least two one-dimensional convolutional layers in the backbone model 421 are different, so that feature extraction is performed on the feature sequence 04 from a time scale. Then, the backbone model 422, the backbone model 423, and the backbone model 424 each gradually perform, in a serial combination manner, feature extraction from a time scale on a feature sequence obtained from a previous backbone model to obtain a feature sequence 12. For an implementation process of each of the backbone model 421 to the backbone model 424, refer to the embodiment shown in FIG. 4B. Details are not described herein.

The backbone model focuses more on extracting the feature from the time scale. To ensure comprehensiveness of the features in the obtained feature sequence, the feature extraction framework 42 may further extract original features of the feature sequence by using the one-dimensional convolutional layer 425 and the one-dimensional convolutional layer 426, and add the extracted original features to the feature sequence obtained by the backbone model, so that features represented by the obtained feature sequence are more comprehensive.

For example, in a process in which the backbone model 421 and the backbone model 422 gradually perform feature extraction on the feature sequence 04 to obtain a feature sequence 06, the one-dimensional convolutional layer 425 performs feature extraction on an original feature of the feature sequence 04 to obtain a feature sequence 07. Then, the linear computation module 427 superimposes the feature sequence 06 and the feature sequence 07, to obtain a feature sequence 08 including both a time scale feature and the original feature of the feature sequence 04. Further, the backbone model 423 and the backbone model 424 gradually perform feature extraction on the feature sequence 08 and the backbone model 424 outputs a feature sequence 09. The one-dimensional convolutional layer 426 performs feature extraction on an original feature of the feature sequence 08 to obtain a feature sequence 10. Then, the linear computation module 428 superimposes the feature sequence 09 and the feature sequence 10, to obtain the feature sequence 11 including both a time scale feature and the original feature of the feature sequence 08. Then, the feature sequence 11 is input to the GAP layer 429.

According to a computation principle of the one-dimensional convolutional layer, the backbone model 424 and the one-dimensional convolutional layer 426 extend each one-dimensional feature to 256 dimensions, so that the feature sequence 11 is a divergent feature sequence. Based on this, convergence may be performed on the feature sequence 11 before the classification. For example, the GAP layer 429 performs weighted averaging on each group of 256 features output by the linear computation module 428 to obtain one-dimensional features, so as to implement convergence of the feature sequence 11, and outputs the converged feature sequence 12. The feature sequence 12 is a feature sequence obtained by the TSE model 40 based on the pose sequence. Then, the TSE model 40 inputs the feature sequence 12 to a classifier.

Figure 4B:
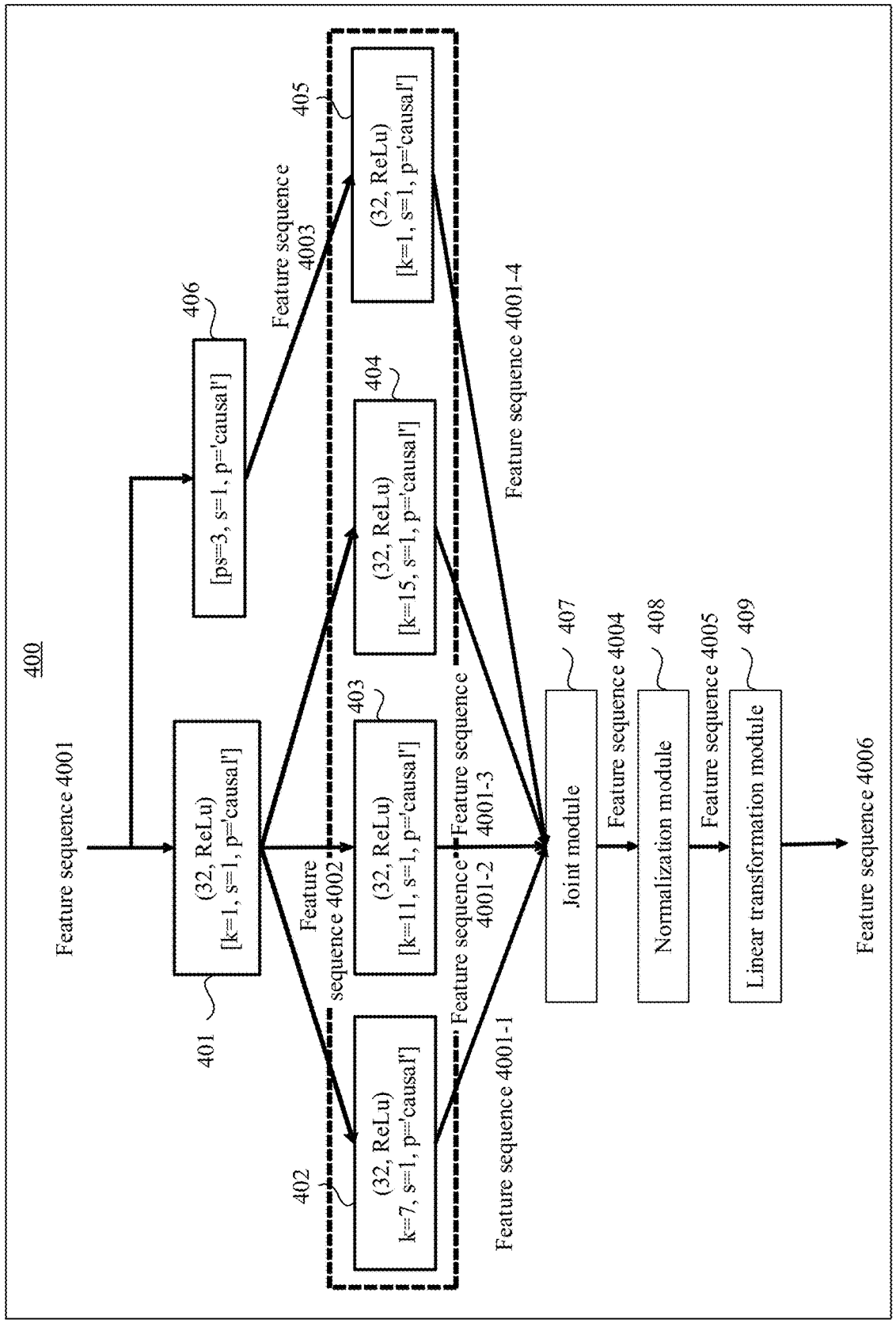
FIG. 4B is a schematic diagram of an example of an operation flow of a backbone model 400 according to an embodiment of this application.

FIG. 4B shows an operation flow of a backbone model 400. As shown in FIG. 4B, the backbone model 400 includes a one-dimensional convolutional layer 401, a one-dimensional convolutional layer 402, a one-dimensional convolutional layer 403, a one-dimensional convolutional layer 404, a one-dimensional convolutional layer 405, a data screening module 406, a joint module 407, a normalization module 408, and a linear computation module 409. In this embodiment, quantities of channels of the one-dimensional convolutional layer 401 to the one-dimensional convolutional layer 405 each are 32.

With reference to FIG. 4B, a feature sequence 4001 is input to the one-dimensional convolutional layer 401 and the data screening module 406. After extending the feature sequence 4001 based on 32 channels, the one-dimensional convolutional layer 401 obtains a feature sequence 4002, and then separately inputs the feature sequence 4002 into the one-dimensional convolutional layer 402, the one-dimensional convolutional layer 403, and the one-dimensional convolutional layer 404. The data screening module 406 filters the feature sequence 4001, to obtain a feature sequence 4003, and inputs the feature sequence 4003 into the one-dimensional convolutional layer 405. Further, the one-dimensional convolutional layer 402 outputs a feature sequence 4001-1 to the joint module 407, the one-dimensional convolutional layer 403 outputs a feature sequence 4001-2 to the joint module 407, the one-dimensional convolutional layer 404 outputs a feature sequence 4001-3 to the joint module 407, and the one-dimensional convolutional layer 405 outputs a feature sequence 4001-4 to the joint module 407.

Values of k in the one-dimensional convolutional layer 402, the one-dimensional convolutional layer 403, the one-dimensional convolutional layer 404, and the one-dimensional convolutional layer 405 are different, which indicates that the one-dimensional convolutional layer 402 to the one-dimensional convolutional layer 405 each perform a convolution operation from a different time scale. To be specific, the one-dimensional convolutional layer 402 to the one-dimensional convolutional layer 405 each perform feature extraction on the feature sequence 4001 from a different time scale. Correspondingly, the feature sequence 4001-1, the feature sequence 4001-2, the feature sequence 4001-3, and the feature sequence 4001-4 each are a feature sequence from a different time scale of the feature sequence 4001. For example, a value of k in the one-dimensional convolutional layer 402 is, for example, 7, a value of k in the one-dimensional convolutional layer 403 is, for example, 11, a value of k in the one-dimensional convolutional layer 404 is, for example, 15, and a value of k in the one-dimensional convolutional layer 405 is, for example, 1.

Further, the joint module 407 joins the feature sequence 4001-1, the feature sequence 4001-2, the feature sequence 4001-3, and the feature sequences 4001-4, to obtain a feature sequence 4004, and input the feature sequences 4004 into the normalization module 408. The feature sequence 4004 corresponds to 128 dimensions. Then, the normalization module 408 performs a normalization operation on the feature sequence 4004 and outputs a feature sequence 4005. Further, the linear computation module 409 performs linear computation on the feature sequence 4005 to output a feature sequence 4006. The feature sequence 4006 is a feature sequence obtained by the backbone model 400 based on the feature sequence 4001.

That the joint module 407 joins the feature sequence 4001-1, the feature sequence 4001-2, the feature sequence 4001-3, and the feature sequence 4001-4 indicates that the feature sequence 4001-1, the feature sequence 4001-2, the feature sequence 4001-3, and the feature sequence 4001-4 are combined to form a sequence. In some embodiments, the joint module 407 uses, for example, the feature sequence 4001-1 as $0^{th}$ to $31^{st}$ pieces of feature data, the feature sequence 4001-2 as $32^{nd}$ to $63^{rd}$ pieces of feature data, the feature sequence 4001-3 as the $64^{th}$ to $95^{th}$ pieces of feature data, and the feature sequence 4001-4 as $96^{th}$ to $127^{th}$ pieces of feature data to obtain the feature sequence 4004. It should be understood that a combination sequence of the joint operation is merely an example, and constitutes no limitation on some embodiments. In some other embodiments, the joint module 407 may further combine the feature sequence 4001-1, the feature sequence 4001-2, the feature sequence 4001-3, and the feature sequence 4001-4 in another order so as to join the feature sequences to obtain one feature sequence.

It may be understood that the backbone model 400 shown in FIG. 4B is merely an example for description, and constitutes no limitation on some embodiments. In some other embodiments, a quantity of one-dimensional convolutional layers in parallel combination in the backbone model may alternatively be another value, for example, 8. The quantities of channels in the one-dimensional convolutional layers and the values of k in the one-dimensional convolutional layers in parallel combination may be other values. For example, a quantity of channels in one-dimensional convolutional layer is 64. In addition, in a scenario in which one feature extraction framework includes a plurality of backbone models, quantities of channels in one-dimensional convolutional layers in different backbone models may be different. For example, a quantity of channels in a one-dimensional convolutional layer in a backbone model 421 and a quantity of a one-dimensional convolutional layer in a backbone model 422 in the feature extraction framework 42 each are 32, and a quantity of channels in a one-dimensional convolutional layer in a backbone model 423 and a quantity of channels in a one-dimensional convolutional layer in the backbone model 424 each are 64.

Figure 4C:
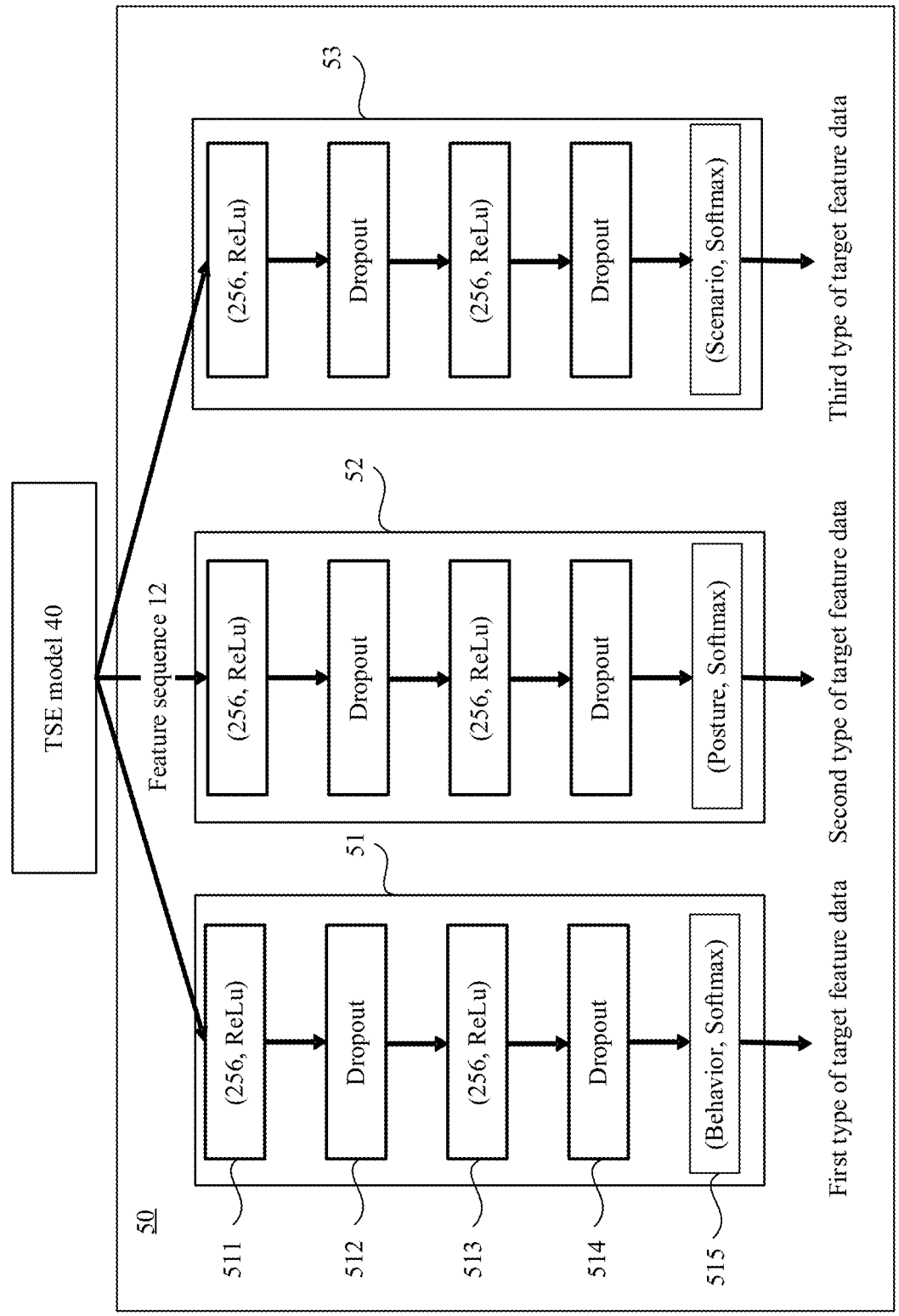
FIG. 4C is a schematic diagram of an example of an operation flow of a classifier 50 according to an embodiment of this application.

FIG. 4C shows an operation flow of a classifier 50. As shown in FIG. 4C, the classifier 50 includes a classification model 51, a classification model 52, and a classification model 53. In this embodiment, the classification model 51 obtains a first type of target feature data based on a feature sequence 12, where the first type of target feature data is used, for example, to represent behavior of a user. The classification model 52 obtains a second type of target feature data based on the feature sequence 12, where the second type of target feature data is used, for example, to represent a posture of the user. The classification model 53 obtains a third type of target feature data based on the feature sequence 12, where the third type of target feature data is used, for example, to represent an activity scenario of the user.

For example, the TSE model 40 inputs the feature sequence 12 to the classifier 50. In other words, the TSE model 40 separately inputs the feature sequence 12 to the classification model 51, the classification model 52, and the classification model 53. Further, the classification model 51, the classification model 52, and the classification model 53 each perform classification computation on the feature sequence 12, to obtain a corresponding type of target feature data. Implementation processes of performing classification computation by the classification model 51, the classification model 52, and the classification model 53 are similar. Descriptions are provided below by using the classification model 51 as an example.

The classification model 51 includes a fully connected layer 511, a dropout layer 512, a fully connected layer 513, a dropout layer 514, and a regression (softmax) layer 515. For example, the fully connected layer 511 may obtain, from the feature sequence 12, a sequence for representing behavior of the user, namely, a feature sequence 121, and input the feature sequence 121 into the dropout layer 512. The dropout layer 512 is configured to fit feature data in the feature sequence 121, to discard some uncritical features in the feature sequence 121 (for example, walking feature data in a feature sequence for representing running), to obtain a feature sequence 122. Further, to improve accuracy of an obtained feature sequence, the fully connected layer 513 and the dropout layer 514 sequentially perform computation on the feature sequence 122, and the dropout layer 514 outputs a feature sequence 123 and inputs the feature sequence 123 to the softmax layer 515. For a computation process of the fully connected layer 513 and the dropout layer 514, refer to the computation process of the fully connected layer 511 and the dropout layer 512. The softmax layer 515 obtains, for example, maximum feature data from the feature sequence 123, and uses the maximum feature data as the target feature data for representing the specific behavior of the user.

Modules included in the classification model 52 and modules included in the classification model 53 are similar to the modules included in the classification model 51. An implementation process in which the classification model 52 obtains, based on the feature sequence 12, the target feature data for representing the posture of the user and an implementation process in which the classification model 53 obtains, based on the feature sequence 12, the target feature data for representing the activity scenario of the user are similar to the implementation process in which the classification model 51 obtains, based on the feature sequence 12, the target feature data for representing the behavior of the user, and are not described in detail herein.

In some embodiments, "target feature data" may be implemented as feature data with a highest level of confidence, or a specific activity state identifier indicated by the feature data with the highest level of confidence. The level of confidence represents a trustworthiness degree that an activity state of a user is that specific state. Higher confidence indicates a higher trustworthiness degree that the activity state of the user is the corresponding state. For example, in a dimension of behavior of the user, if confidence that the specific behavior of the user is walking is at 0.6, and the confidence that the specific behavior of the user is running is at 0.9, the confidence that the specific activity of the user is running is higher.

It should be noted that a fully connected layer in the classifier 50 may be implemented as a one-dimensional convolutional layer.

It may be understood that the classifier 50 is merely an example for description, and constitutes no limitation on some embodiments. In other embodiments, the classifier may further include more or fewer classification models. In addition, each classification model may also include more or fewer fully connected layers and dropout layers. This is not limited in some embodiments.

Further, in some embodiments, the three pieces of target feature data obtained by the classifier 50 are transmitted as data of the activity state of the user to a map display module in the mobile phone, so that the map display module obtains the data and controls display of a corresponding icon.

In some other embodiments, the three pieces of target feature data obtained by the classifier 50 are input into an AR smoothing module so as to predict a possible actual activity state of the user by using the AR smoothing module. Then, data that is obtained by the AR smoothing module and for representing the possible actual activity state of the user is used as data of the activity state of the user and input into a map display module in the mobile phone, so that the map display module obtains the data and controls display of a corresponding icon.

The AR smoothing module may maintain a state transition matrix of the activity state of the user, and the state transition matrix includes a transition probability between any two states. The three dimensions are used as an example. In this embodiment, the AR smoothing module may separately maintain three state transition matrices. The three state transition matrices separately maintain a transition probability between any two actions from the dimension of the behavior of the user, a transition probability between any two postures from the dimension of the posture of the user, and a transition probability between any two activity scenarios from the dimension of the activity scenario of the user. After receiving the three pieces of target feature data, the AR smoothing module separately obtains possible specific activities of the user from the three dimensions based on the three pieces of target feature data and three state transition probabilities.

The dimension of the behavior of the user is used as an example. The AR smoothing module obtains, based on a preset smoothing algorithm and the state transition matrix and the target feature data corresponding to the behavior of the user, a probability that the behavior corresponding to the target feature data is transferred to another behavior. When obtained probabilities have a probability greater than a first preset threshold, the AR smoothing module determines, as possible actual behavior of the user, transferred behavior corresponding to a highest probability, and further uses the transferred behavior as behavior for representing the activity state of the user. When all the obtained probabilities are less than a first preset threshold, the AR smoothing module uses the target feature data corresponding to the behavior of the user as behavior for representing the activity state of the user. The first preset threshold may be set based on an empirical value. In a possible implementation, the first preset threshold is, for example, 98%.

For example, if behavior indicated by the target feature data corresponding to the behavior of the user is walking, the AR module computes, based on the state transition matrix corresponding to the behavior of the user, for example, a probability of switching the behavior of the user from walking to a standstill and a probability of switching the behavior of the user from walking to running. If the two probabilities are less than 98%, the AR smoothing module determines that the specific activity of the user is walking. If the probability that the user switches from walking to running is greater than or equal to 98%, the AR smoothing module determines that actual behavior of the user may be running, and further uses running as the specific behavior for representing the activity state of the user.

The process of the AR smoothing module performs a smoothing process on the posture of the user based on the target feature data and the state transition matrix corresponding to the posture of the user and performs a smoothing process on the activity scenario of the user based on the target feature data and the state transition matrix corresponding to the activity scenario of the user is similar to that in the foregoing description, and details are not described herein.

It should be noted that the state transition matrix may be obtained through training based on a hidden Markov model (HMM).

Further, a correspondence between each specific activity and icon description information may be maintained in the mobile phone, and an icon indicated by the icon description information is an image for representing a corresponding activity. Based on this, after receiving the data of the activity state of the user, the map display module may obtain icon description information corresponding to the data of the activity state of the user, render an icon based on the icon description information, and display the corresponding icon in the map app interface.

For example, when the data of the activity state of the user includes the three pieces of target feature data, each piece of target feature data corresponds to one piece of icon description information. Further, the mobile phone may separately perform rendering based on the icon description information corresponding to each of the three pieces of target feature data, for example, obtain content included in the icon interface 322, and then display the GUI 32 on the mobile phone.

Embodiment 2

Further, the user may trigger, based on a requirement, an associated display of the activity state of the person and a position of the user. For example, on the basis of the GUI 32 shown in FIG. 3B, in response to an operation instruction of the user to enlarge the icon interface 322 by using two fingers, the mobile phone displays the activity state of the person and the position of the user in an association manner. Correspondingly, the GUI 32 shown in FIG. 3B is updated to a GUI 33 shown in FIG. 3D.

As shown in FIG. 3D, the GUI 33 shown in FIG. 3D is another example of a display interface on a map. The GUI 33 includes a map interface 331, a personal center interface, a shortcut function trigger control, and the like. The map interface 331 is a map interface centered on the position of the user, and the map interface 331 displays an icon 3221 and an icon 3222 in an area indicating the position of the user. The icon 3221 and the icon 3222 are described in the embodiment corresponding to FIG. 3B, and are not described in detail herein. In this embodiment, a display position of the icon 3221 in the map interface 331 may change with an actual position of the user, and the icon 3222 may be displayed or hidden based on an environment adaptability associated with actual behavior of the user. In this way, the map app can display the activity state of the user in real time, accurately, and vividly, and improve visual experience of the user. The personal center interface and the shortcut function trigger control are described in the embodiment corresponding to FIG. 3B, and are not described in detail herein.

It should be noted that, for ease of viewing by the user, colors and/or a luminance of the icon 3221 and the icon 3222 in the GUI 33 may contrast with a color and/or luminance of other part in the map interface 331. For example, the color of the other part in the map interface 331 is light blue, and the colors of the icon 3221 and the icon 3222 may be presented as black.

In addition, the map interface 331 shown in FIG. 3D is presented in a plan view display mode. In some other embodiments, the map interface 331 may alternatively be presented in another display mode, for example, a sectional view mode. This is not limited in some embodiments.

Figure 3E:
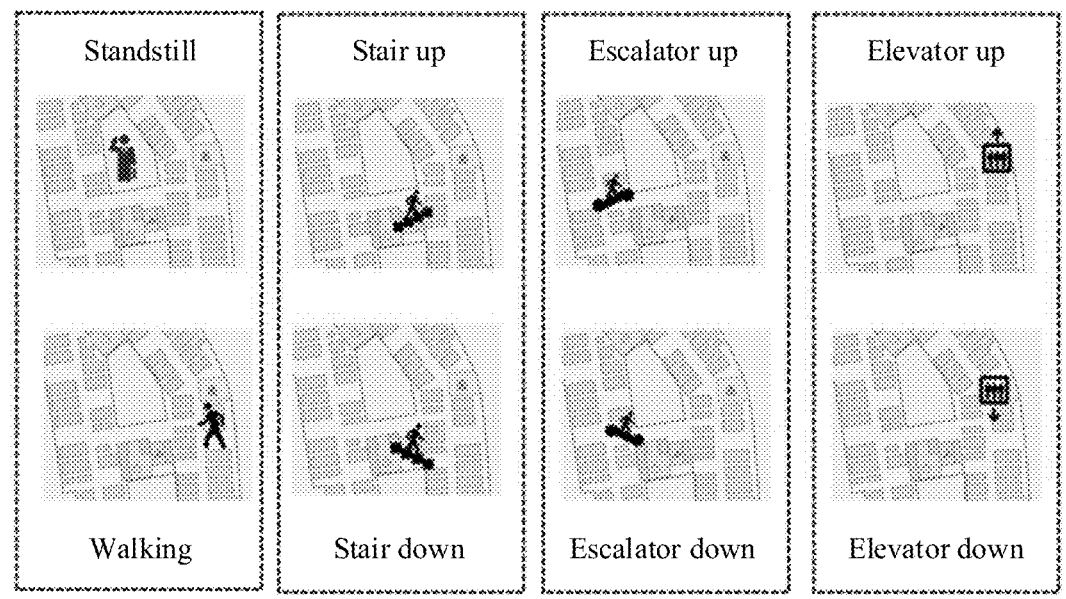
FIG. 3E is a schematic diagram of a fourth example interface of a map display interface according to an embodiment of this application.

It may be understood that the icon shown in FIG. 3D is merely an example of presentation, and constitutes no limitation on some embodiments. In some embodiments, the icon displayed on the mobile phone is associated with an actual activity of the user. For example, FIG. 3E shows eight schematic map interfaces. Icons in the eight map interfaces each represent an activity state of a person. Activity states represented by the icons in the eight map interfaces are shown by identifiers shown in FIG. 3E, and details are not described herein again.

Based on the description of the foregoing embodiments, after the user taps the map 310 in the GUI 31, the GUI 31 may be directly switched to a display interface of the GUI 33. In this embodiment, the user may further cut off the association between the activity state of the person and the position of the user based on a requirement. For example, on the basis of the GUI 33 shown in FIG. 3D, in response to a pinching operation instruction by the user, the mobile phone cuts off the association between the activity state of the person and the position of the user. Correspondingly, the GUI 33 shown in FIG. 3D is updated to the GUI 32 shown in FIG. 3B.

Embodiment 3

In the implementation scenario corresponding to FIG. 3D, in some embodiments, the mobile phone may further control, based on the activity state of the person and the position of the user, the map to display recommendation information, where the recommendation information indicates an area recommended to the user. Examples of a display interface in which the mobile phone displays the recommendation information are shown in FIG. 3F and FIG. 3G.

For example, the mobile phone may determine, based on obtained batch data, an area in which people appear frequently and a specific activity state when people appear in the corresponding area. The area in which people appear frequently is usually a hot area popular with the user. In some embodiments, the corresponding area is used as a to-be-recommended area. Then, the mobile phone may store a correspondence between a corresponding area and a specific activity state of the user. When it is detected that the activity state of the person is the corresponding specific activity state, and a closest distance between the position of the user and the corresponding area is less than or equal to a preset distance, the map display module in the mobile phone triggers the map to display the recommended information, where the recommended information indicates the corresponding to-be-recommended area.

The mobile phone may determine an area in which a quantity of occurrences within a period of time is greater than a second preset threshold as an area with a high occurrence frequency. The period of time is, for example, three months. The second preset threshold may be flexibly set based on different areas. For example, when the area is a pedestrian street in a city center, the second preset threshold is, for example, 100,000. For another example, when the area is a walking trail of a cell, the second preset threshold is, for example, 2000. In addition, the preset distance may be flexibly set based on an actual scenario. For example, when the implementation scenario is inside a shopping mall, the preset distance is 50 meters. For another example, when the implementation scenario is a park, the preset distance is, for example, 150 meters.

Figure 3F:
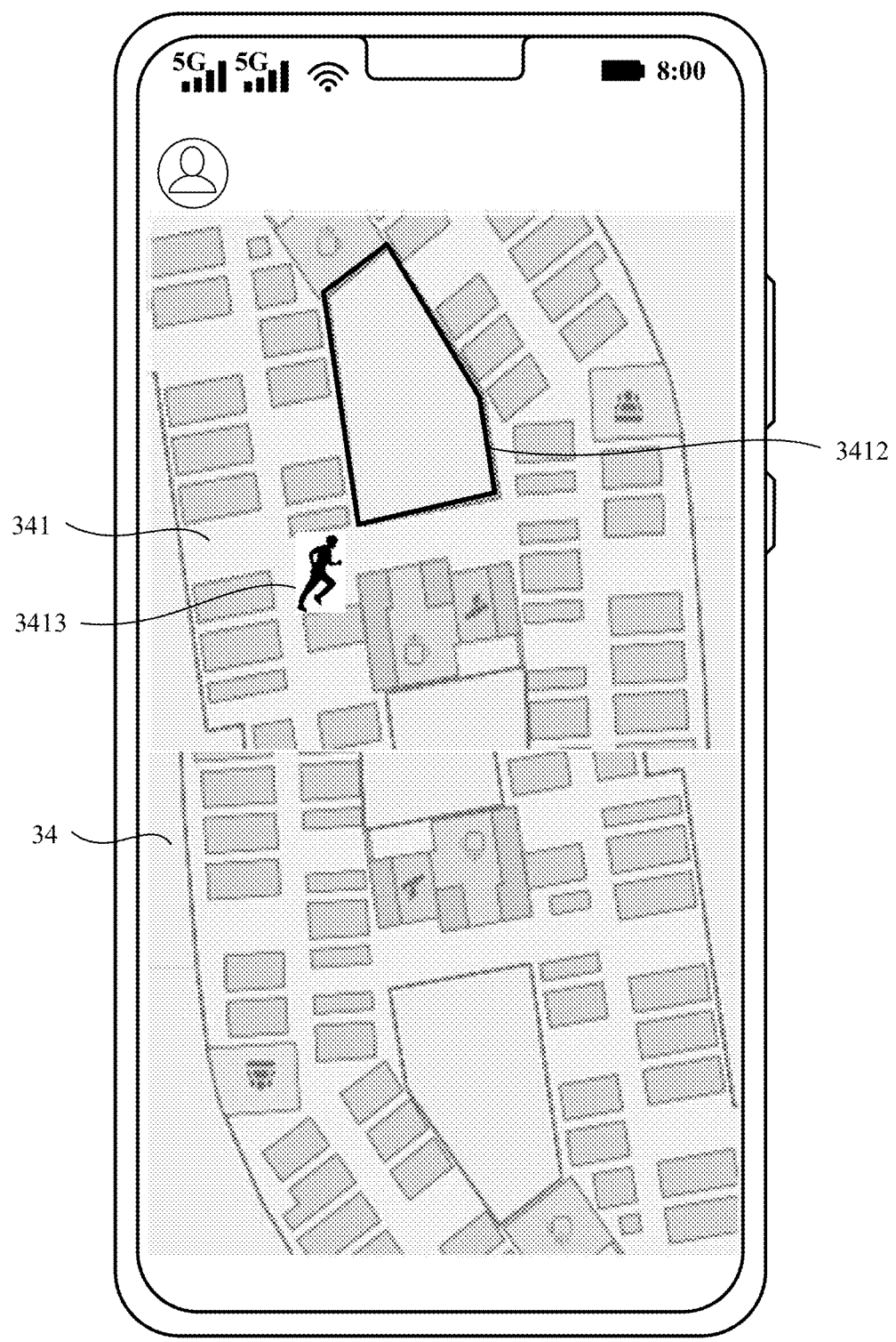
FIG. 3F is a schematic diagram of a fifth example interface of a map display interface according to an embodiment of this application.
Figure 3G:
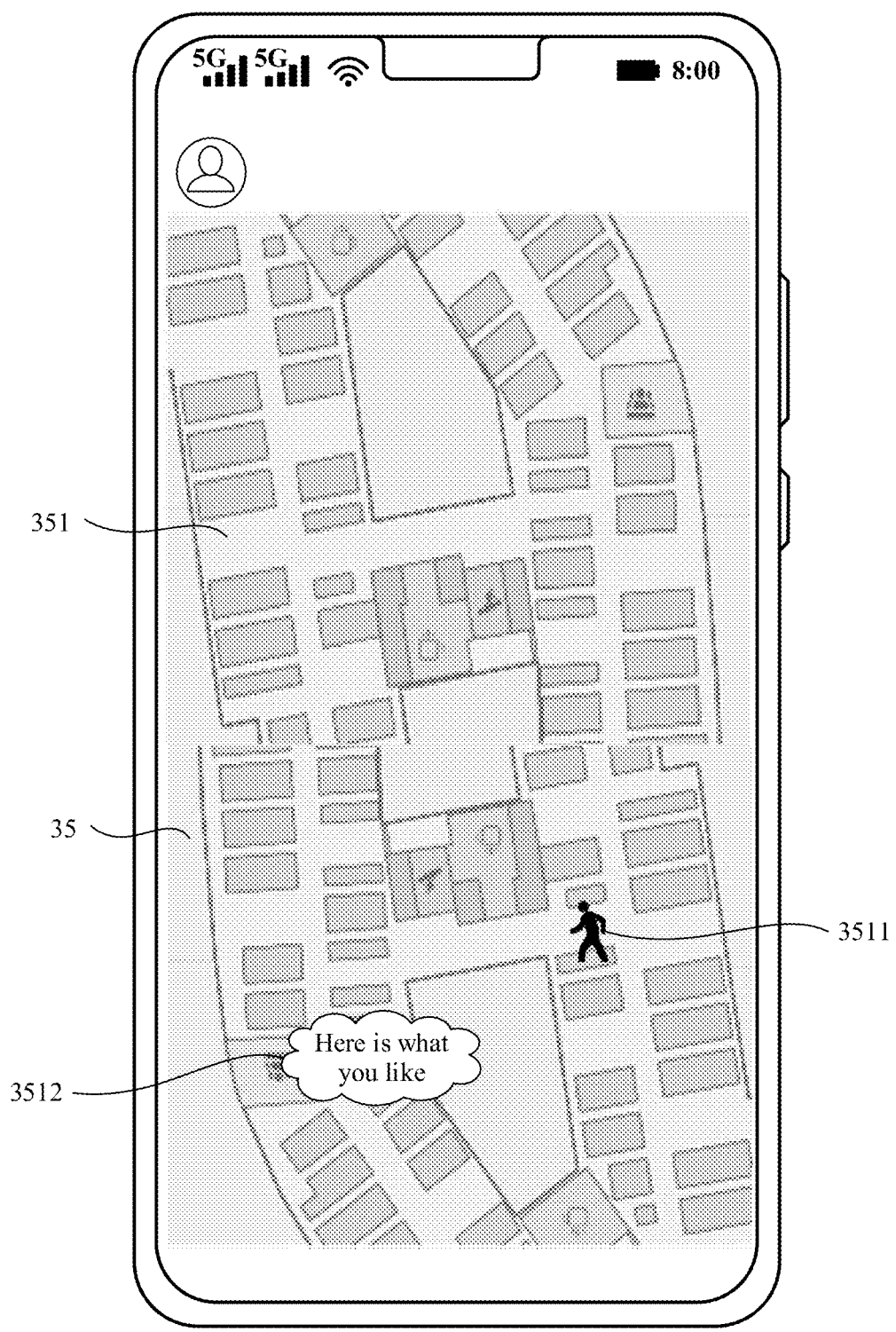
FIG. 3G is a schematic diagram of a sixth example interface of a map display interface according to an embodiment of this application.

As shown in FIG. 3F, a GUI 34 shown in FIG. 3F is an example of a display interface in which a map app displays recommendation information. The GUI 34 includes a map interface 341. A color of an icon 3411 in the map interface 341 and a color of an edge line of an area 3412 are different from a color of other areas in the map interface 341. In this embodiment, the icon 3411 represents that the activity state of the person is a running state. The edge line of the area 3412 represents, for example, a walking trail. The area 3412 may include an identifier 3414, and content of the identifier 3414 is a name "walking trail" of the area 3412. After detecting that the activity state of the person is the running state, the mobile phone may determine, based on the pre-stored correspondence, an area corresponding to the running state. The area includes, for example, the area 3412. Then, the mobile phone detects the position of the user, and obtains a position 3413 in the GUI 34. If the mobile phone determines that the nearest distance between the position 3413 and the area 3412 is less than or equal to 150 meters, the map display module in the mobile phone controls the edge line of the area 3412 to be displayed in the color different from that of the other parts in the map interface 341, to obtain the GUI 34, so as to recommend the walking trail to the user in a highlighted manner.

In other embodiments, the edge line of the area 3412 may be displayed in flash.

As shown in FIG. 3G, a GUI 35 shown in FIG. 3G is another example of a display interface in which a map app displays recommendation information. The GUI 35 includes a map interface 351. An icon 3511 and a dialog box 3512 are included in the map interface 351. Content in the dialog box 3512 is, for example, "Here is what you like". A color of the icon 3511 in the map interface 351 is different from a color of other areas in the map interface 351. In this embodiment, an environment of a user is, for example, a shopping mall. The icon 3511 represents that an activity state of a person is a walking state. The mobile phone may determine, based on a pre-stored area, an area in which people enter and exit frequently in the shopping mall. Then, if the mobile phone determines that a closest distance between a position of the user and a corresponding area is less than or equal to 50 meters, a map display module in the mobile phone displays the dialog box 3512 in the corresponding area to obtain the GUI 35 so as to recommend a popular store to the user by using prompt information.

In other embodiments, when displaying the dialog box 3512, the mobile phone may also play a sound to remind the user.

It should be understood that the foregoing embodiment in which the mobile phone displays the recommendation information is merely an example of description, and constitutes no limitation on some embodiments. In some other embodiments, the mobile phone may further display the recommendation information in another manner or a combination of several other manners.

It can be learned that, in this implementation, the mobile phone can adaptively recommend a popular area to the user based on the activity state of the person and the position of the user. This can provide a more visualized service for the user based on the map, and optimize user experience.

Embodiment 4

Figure 5A:
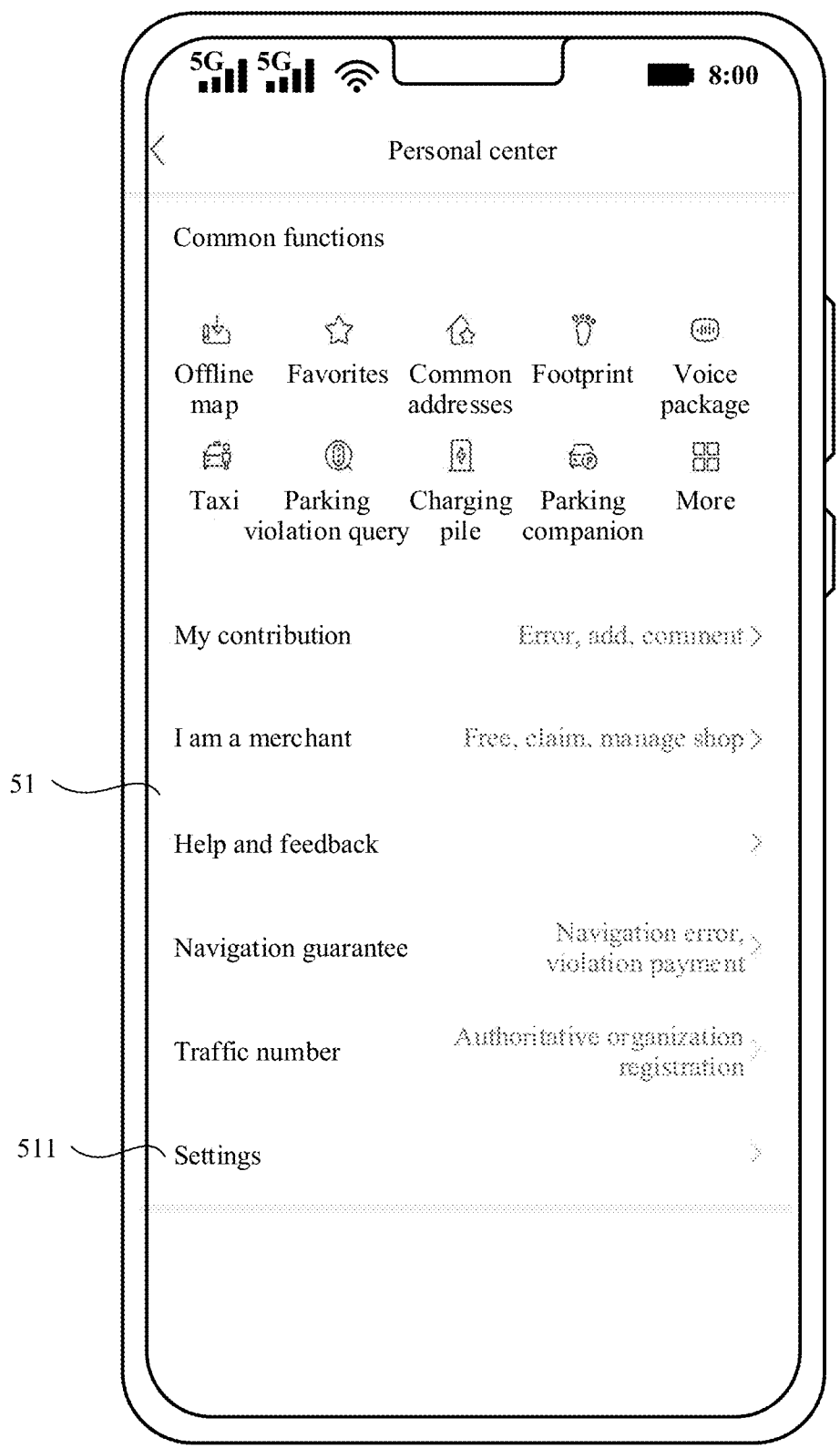
FIG. 5A is a schematic diagram of a first example interface in which a user selects a display mode according to an embodiment of this application.
Figure 5B:
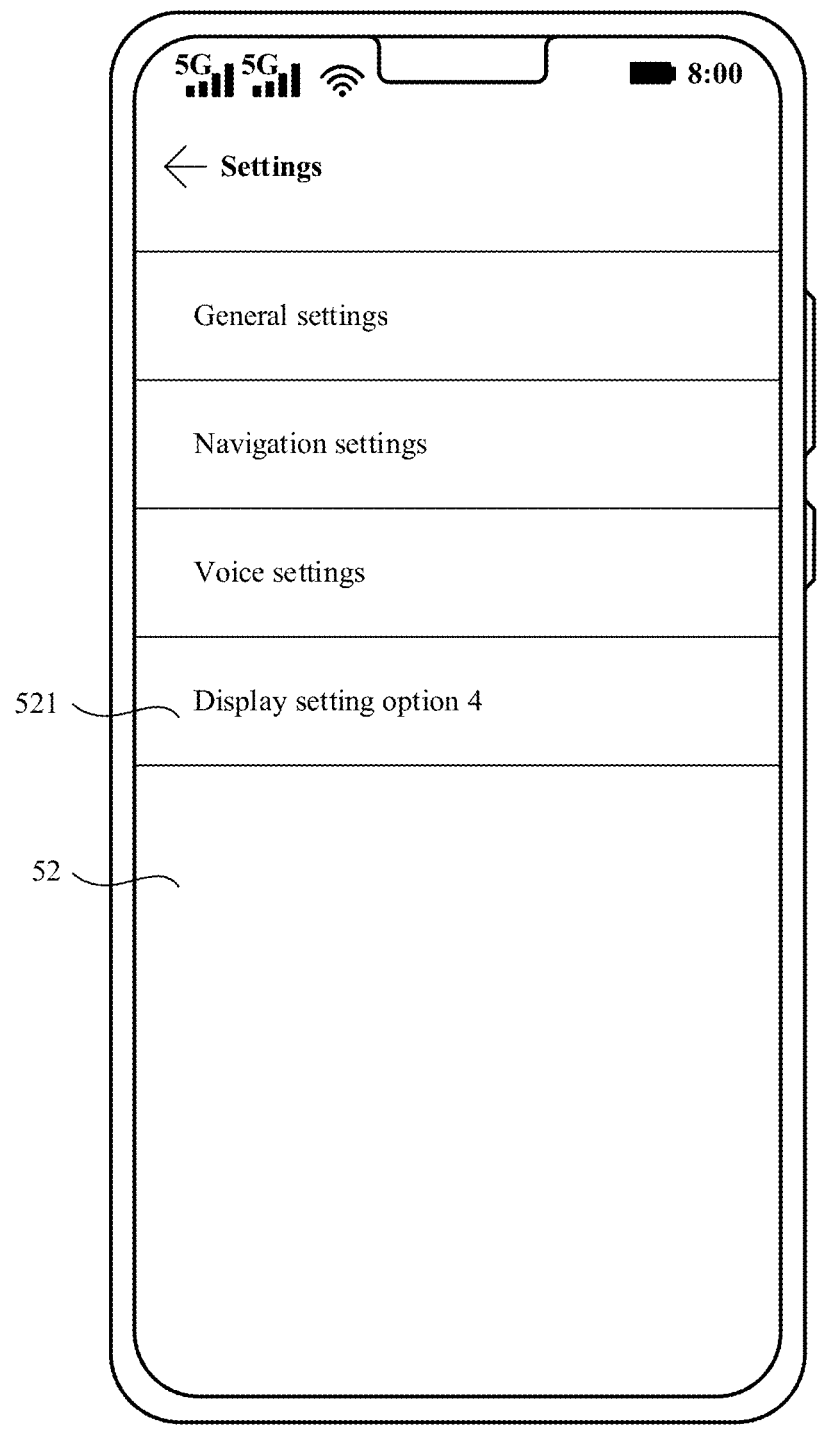
FIG. 5B is a schematic diagram of a second example interface in which a user selects a display mode according to an embodiment of this application.
Figure 5C:
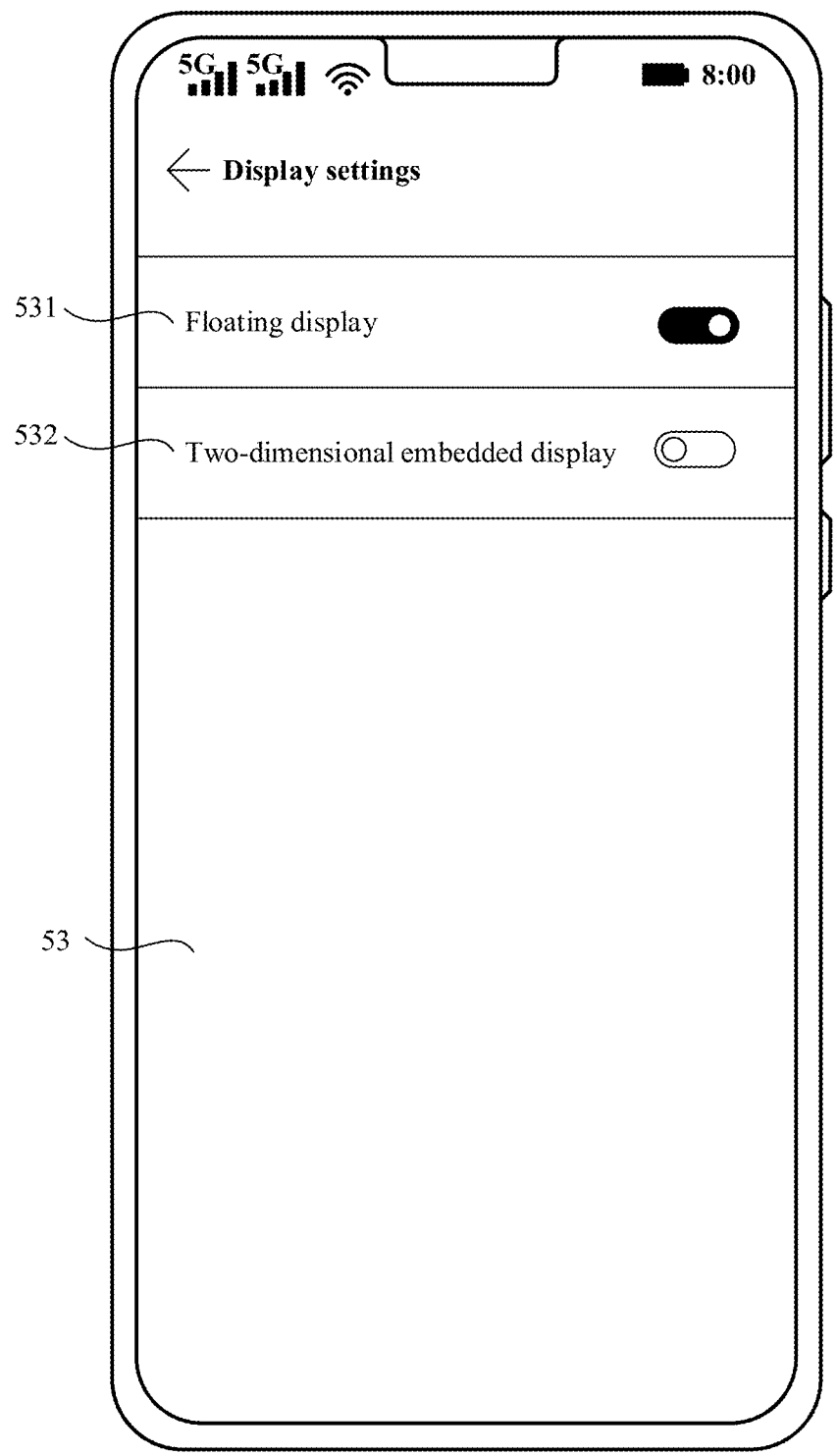
FIG. 5C is a schematic diagram of a third example interface in which a user selects a display mode according to an embodiment of this application.

Based on the description of the foregoing embodiments, the mobile phone provides a plurality of display modes for the map app. Based on this, the user may independently select a display mode of the map app. FIG. 5A to FIG. 5C show examples of display interfaces in a process in which the mobile phone makes response to a selection operation performed by the user.

With reference to the descriptions of the embodiment shown in FIG. 3B, a personal center of the map app provides an interface for setting each function item of the map app. As shown in FIG. 5A, a GUI 51 shown in FIG. 5A is an example of a display interface of a main interface of the personal center of the map app. The GUI 51 includes a setting interface for various common functions and a setting interface for a user's personalized function. Common functions include an Offline map, Taxi, Common addresses, and the like. User's personalized functions include My contribution, I am a merchant, and Settings 511. After receiving an operation instruction by tapping Settings 511 by the user, in response to the operation instruction, the mobile phone enters a setting main interface, and the GUI 51 shown in FIG. 5A is updated to a GUI 52 shown in FIG. 5B.

As shown in FIG. 5B, the GUI 52 shown in FIG. 5B is an example of a display interface of a map app setting main interface. The GUI 52 includes setting items such as General settings, Navigation settings, Voice settings, and Display settings 521. After receiving an operation instruction of tapping Display settings 521 by the user, in response to the operation instruction, the mobile phone enters a display setting interface, and the GUI 52 shown in FIG. 5B is updated to a GUI 53 shown in FIG. 5C.

As shown in FIG. 5C, the GUI 53 shown in FIG. 5C is an example of a display interface of a map app display setting interface. The GUI 53 includes display mode options such as Floating display 531 and Two-dimensional embedded display 532. For example, after receiving an operation instruction that the user selects Floating display 531, the mobile phone displays an icon interface in a small window in the map interface, as shown in FIG. 3B and FIG. 3C. After receiving an operation instruction that the user selects Two-dimensional embedded display 532, the mobile phone embeds the icon into the map interface for display, as shown in FIG. 3D and FIG. 3E.

It may be understood that FIG. 5C is merely an example description, and constitutes no limitation on the display mode in some embodiments. In some embodiments, the mobile phone may further include more or fewer display mode options. For example, in some other embodiments, the mobile phone further includes an icon display color option, or an icon style option.

Embodiment 5

Figure 6:
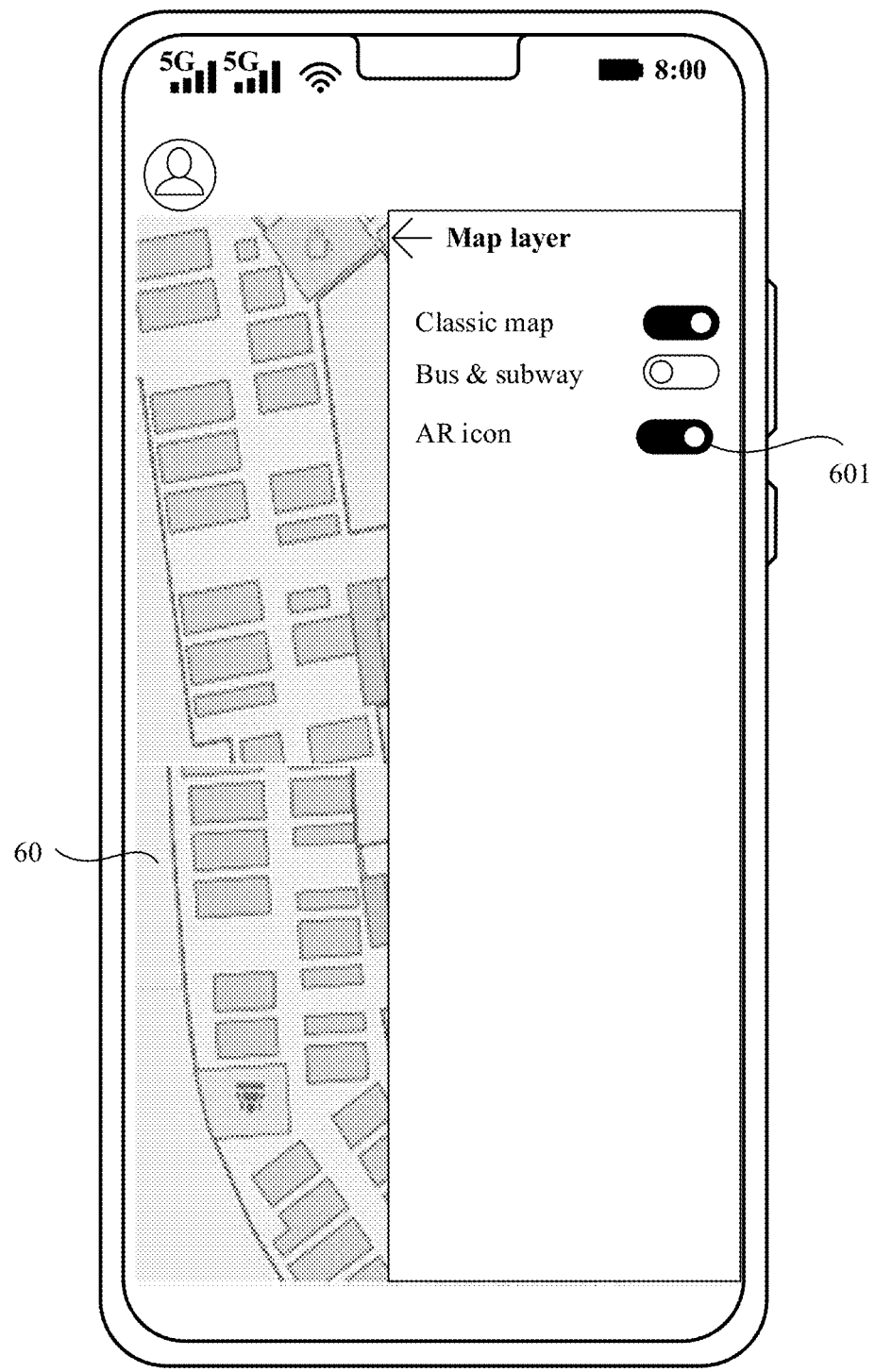
FIG. 6 is a schematic diagram of an example interface of a user operation interface according to an embodiment of this application.

Scenarios shown in Embodiment 1 to Embodiment 4 are all scenarios in which a function of displaying the activity state of the person is enabled on the map. In an actual operation, the user may trigger, based on a requirement, to disable the function of displaying the activity state of the person. FIG. 6 shows an example of a display interface in which the mobile phone makes response to a disable operation performed by the user.

With reference to the descriptions of the embodiment shown in FIG. 3B, the main interface of the map app includes the entry for the shortcut function of Map layer 3241, and the user may disable the function of displaying the activity state by using a function provided by Map layer 3241. As shown in FIG. 6, a GUI 60 shown in FIG. 6 is an example of a display interface of a layer setting interface. The GUI 60 includes options for map display items such as Classic map, Bus subway, and AR icon 601, where Classic map and AR icon 601 are selected. For example, that is, Classic map and AR icon 601 each are in a selected state. In this embodiment, AR icon 601 indicates the map app to display the icon. After receiving an operation of tapping AR icon 601 by the user, in response to the operation instruction, the mobile phone cancels displaying the icon, and switches the AR icon 601 to an unselected state. Further, the icon is no longer displayed in the map interface. Certainly, after receiving an operation of tapping the AR icon 601 by the user again, in response to the operation instruction, the mobile phone displays the icon again, and switches the AR icon 601 to the selected state. Further, the icon is displayed again in the map interface.

It can be learned that, in this implementation, the user can flexibly set whether to display the activity state of the person in the map interface, to optimize use experience.

It may be understood that FIG. 3A to FIG. 6 are merely example descriptions, and constitute no limitation on embodiments of this application. In some other embodiments, the display interface of the map may vary with a map app version. In the foregoing embodiments, the color and the style of the icon may alternatively be other, and the display mode or the like of the recommendation information may alternatively be other. This is not limited in embodiments of this application.

In addition, in the foregoing embodiments, the mobile phone is merely used as an example for description, and constitutes no limitation on embodiments of this application. In some other embodiments, the electronic device in embodiments of this application may be alternatively a foldable screen device, a tablet computer, or the like. This is not limited here.

In conclusion, the AR module running in the electronic device in embodiments of this application extracts the features of the activity state of the person from the pose sequence of the electronic device by using the stacked one-dimensional convolutional layers. This not only has high scalability, but also can extract the features for representing the activity state of the person from the plurality of dimensions so that the activity state of the person is more detailed and accurate. In addition, the AR module interacts with the map function, so that the electronic device can adaptively present the activity state of the person in real time in the map interface. This can optimize a visual effect of the map function and improve user experience.

The foregoing embodiments describe the solutions of the activity recognition method and the display method provided in this application from perspectives of a hardware structure, a software architecture of the electronic device, and actions performed by each piece of software and hardware. A person skilled in the art should be easily aware that, with reference to embodiments disclosed in this specification, processing steps such as obtaining a pose and obtaining feature data can be implemented in this application by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

Figure 7A:
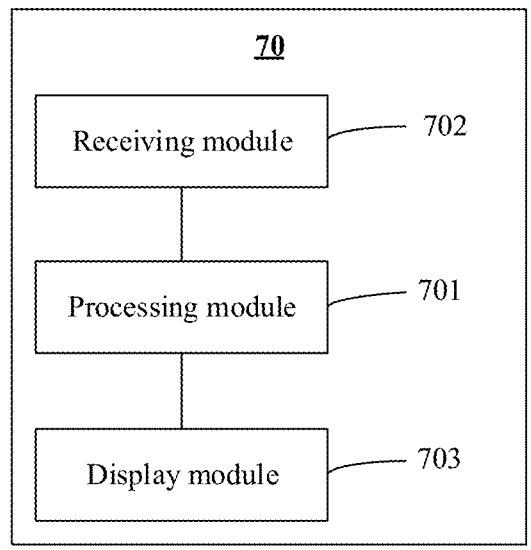
FIG. 7A is a schematic diagram of an example of composition of an electronic device 70 according to this application.

For example, the electronic device 100 may implement the corresponding functions in a form of a functional module. As shown in FIG. 7A, an electronic device 70 may include a processing module 701, a receiving module 702, and a display module 703. The processing module 701 includes an AR module. The processing module 701 may be configured to perform functions such as feature data extraction, classification, and display control in any embodiment shown in FIG. 2B to FIG. 5C. The receiving module 702 may be configured to perform receiving of the operation instruction and sensor data in any embodiment shown in FIG. 2A to FIG. 6. The display module 703 may be configured to perform functions such as interface display in any embodiment shown in FIG. 2A to FIG. 6.

Figure 7B:
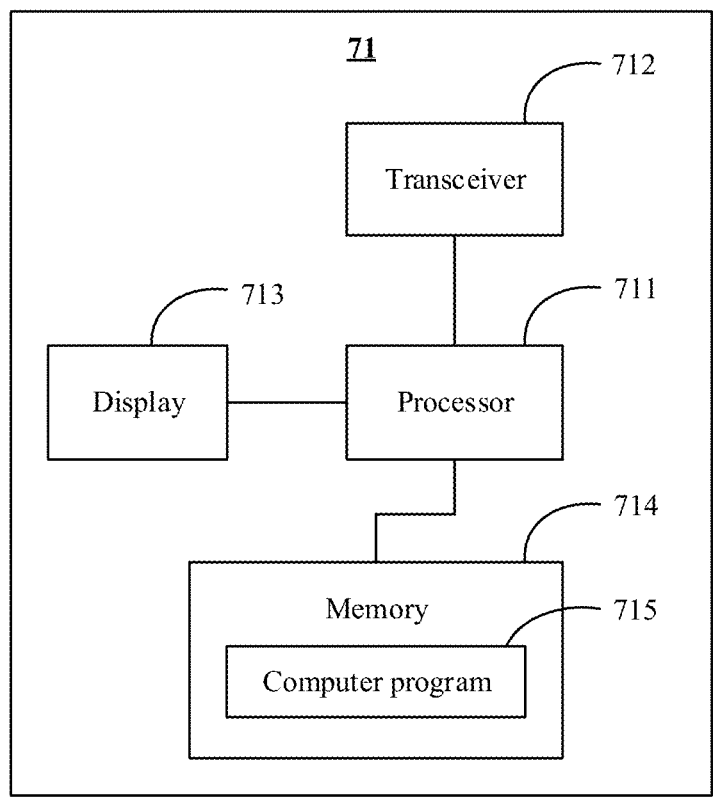
FIG. 7B is a schematic diagram of an example of a structure of an electronic device 71 according to this application.

It may be understood that division into the foregoing modules is merely logical function division. During actual implementation, all or a part of the modules may be integrated into one physical entity, or may be physically separated. For example, a function of the processing module 701 may be integrated into a processor for implementation, a function of the receiving module 702 may be integrated into a transceiver for implementation, and a function of the display module 703 may be integrated into a display for implementation. As shown in FIG. 7B, an electronic device 71 may include a processor 711, a transceiver 712, a display 713, and a memory 714. The memory 714 is configured to:

be coupled to the processor 711, and store a computer program 715 necessary for the electronic device 71. The processor 711 is configured to invoke the computer program 715 to perform operations such as data processing and display control of the electronic device in FIG. 2A to FIG. 6. The transceiver 712 is configured to receive various instructions input by a user and sensor data of the electronic device. The display 713 is configured to display a map on the electronic device 71 and an icon of an activity state of a person. Details are not described herein.

In an implementation, in correspondence to the electronic device, this application further provides a computer storage medium. The computer storage medium may be disposed in any device that may store a program. When the program is executed, some or all of the steps in embodiments of the methods provided in FIG. 2A to FIG. 6 may be implemented. The storage medium in any device may be a magnetic disk, an optical disc, a read-only memory (ROM), a random access memory (RAM), or the like.

One or more of the foregoing modules or units (e.g., circuits) may be implemented by software, hardware, or a combination thereof. When any one of the foregoing modules or units is implemented by software, the software exists in a form of a computer program instruction, and is stored in a memory. The processor may be configured to execute the program instruction and implement the foregoing method procedure. The processor may include but is not limited to, at least one of the following types: a central processing unit (CPU), a microprocessor, a digital signal processor (DSP), a microcontroller unit (MCU), and a computing device used for running software like an artificial intelligence processor. Each computing device may include one or more cores used to execute software instructions to perform operations or processing. The processor may be built in a SoC (system on a chip) or an application-specific integrated circuit (ASIC), or may be an independent semiconductor chip. In addition to the cores used to execute the software instruction to perform operations or processing, the processor may further include a necessary hardware accelerator, such as a field programmable gate array (FPGA), a PLD (programmable logic device), or a logic circuit implementing a dedicated logical operation.

When the foregoing modules or units are implemented by hardware, the hardware may be any one of or any combination of a CPU, a microprocessor, a DSP, an MCU, an artificial intelligence processor, an ASIC, a SoC, an FPGA, a PLD, a dedicated digital circuit, a hardware accelerator, or a non-integrated discrete device. The hardware may run necessary software or without software to execute the foregoing method procedure.

When the foregoing modules or units are implemented by using software, all or a part of the foregoing modules or units may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments.

Embodiments in this specification are all described in a progressive manner, for same or similar parts in embodiments, refer to these embodiments, and each embodiment focuses on a difference from the other embodiments. Especially, apparatus and system embodiments are basically similar to a method embodiment, and therefore are described briefly; for related parts, refer to partial descriptions in the method embodiment.

The objectives, technical solutions, and beneficial effect of the present disclosure are further described in detail in the foregoing implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. An activity recognition method, comprising:
   obtaining a plurality of poses of an electronic device in a time period;
   obtaining, by using a plurality of one-dimensional convolutional layers, one or more pieces of feature data based on the plurality of poses, wherein the one or more pieces of feature data indicate different types of information of a user holding the electronic device in the time period, and a type of information indicated by each piece of feature data is a state of motion of the user, an action of the user, or a vehicle transporting the user; and
   displaying the types of the information indicated by the one or more pieces of feature data as an icon;
   wherein the obtaining, by using the plurality of one-dimensional convolutional layers, the one or more pieces of feature data based on the plurality of poses comprises:
   performing feature extraction on the plurality of poses, by using m one-dimensional convolutional layers in serial combination in a first feature extraction framework, to obtain an initial feature data group; and
   performing feature extraction on the initial feature data group, by using n backbone models in serial combination in a second feature extraction framework, to obtain the one or more pieces of feature data, wherein:
   each of the n backbone models comprises at least two one-dimensional convolutional layers in parallel combination, and
   m and n each are a positive integer.

2. The method according to claim 1, wherein the performing feature extraction on the plurality of poses by using the m one-dimensional convolutional layers in serial combination in the first feature extraction framework comprises:

performing feature extraction on a first initial feature data group, by using an $i^{th}$ one-dimensional convolutional layer in the m one-dimensional convolutional layers, to obtain a second initial feature data group, wherein:

the first initial feature data group is a feature data group obtained based on the plurality of poses by using an $(i-1)^{th}$ one-dimensional convolutional layer in the m one-dimensional convolutional layers, and i is greater than or equal to 2 and less than or equal to m.

3. The method according to claim 1, wherein
the at least two one-dimensional convolutional layers in parallel combination in each backbone model have cores of different values.

4. The method according to claim 1, wherein the performing feature extraction on the initial feature data group, by using the n backbone models in serial combination in the second feature extraction framework, to obtain the one or more pieces of feature data comprises:

performing feature extraction on the initial feature data group, by using the n backbone models in serial combination in the second feature extraction framework, to obtain a feature data group; and obtaining, through screening, the one or more pieces of feature data from the feature data group.

5. The method according to claim 4, wherein the obtaining, through screening, the one or more pieces of feature data from the feature data group comprises:

obtaining, based on the feature data group, a child feature data group corresponding to each of all or a part of the at least one type of information; and separately obtaining feature data with a highest level of confidence from each child feature data group, and using all feature data with the highest levels of confidence as the one or more pieces of feature data, wherein the level of confidence indicates a trustworthiness degree of behavior corresponding to corresponding feature data.

6. The method according to claim 5, wherein after the obtaining feature data with the highest level of confidence from each child feature data group, the method further comprises:

calculating, based on each piece of feature data and a state transition matrix associated with the feature data, a probability that an activity state corresponding to the feature data is transferred to another activity state, to obtain at least one probability value, and the state transition matrix comprises a probability of mutual transition between any two activity states in the type of the information indicated by the feature data; and when the at least one probability value comprises a value greater than a first preset threshold, using, as the feature data corresponding to the type, transferred activity state data corresponding to a largest probability value in the probability value greater than the first preset threshold; or when the at least one probability value does not comprise a value greater than the first preset threshold, using feature data with the highest level of confidence as the feature data corresponding to the type.

7. The method according to claim 1, wherein a map is also displayed on a screen of the electronic device, and at least a part of the icon is displayed on the map.

8. The method according to claim 1, wherein the obtaining of the plurality of poses of the electronic device in the time period comprises:

obtaining at least one group of sensor data for representing the poses of the electronic device;

detecting whether data loss occurs in each of the at least one group of sensor data;

performing sampling and linear interpolation on at least one group of sensor data in which no data loss occurs, to obtain a plurality of pieces of sensor data; and performing filtering and gravity residual removal operations on the plurality of pieces of sensor data, to obtain the plurality of poses.

9. The method according to claim 8, wherein the sensor data comprises measurement data of a gyroscope sensor, measurement data of an acceleration sensor, and measurement data of a magnetic sensor.

10. An electronic device, comprising a processor, a memory, and a display, wherein the processor is coupled to the memory, the memory is configured to store a program or instructions, and the processor executes the program or the instructions to obtain a plurality of poses of the electronic device in a time period;

the processor is further configured to: obtain, by using a plurality of one-dimensional convolutional layers, one or more pieces of feature data based on the plurality of poses, wherein the one or more pieces of feature data indicate different types of information of a user holding the electronic device in the time period, and a type of information indicated by each piece of feature data is a state of motion of the user, an action of the user, or a vehicle transporting the user; and the display is configured to display, in response to an instruction of the processor, as an icon, the types of the information indicated by the one or more pieces of feature data;

wherein that the processor obtains, by using the plurality of one-dimensional convolutional layers, the one or more pieces of feature data based on the plurality of poses comprises:

the processor is configured to perform feature extraction on the plurality of poses, by using m one-dimensional convolutional layers in serial combination in a first feature extraction framework, to obtain an initial feature data group; and the processor is further configured to perform feature extraction on the initial feature data group, by using n backbone models in serial combination in a second feature extraction framework, to obtain the one or more pieces of feature data, wherein:

each of the n backbone models comprises at least two one-dimensional convolutional layers in parallel combination, and m and n each are a positive integer.

11. The electronic device according to claim 10, wherein that the processor performs feature extraction on the plurality of poses by using the m one-dimensional convolutional layers in serial combination in the first feature extraction framework comprises:

the processor is configured to perform feature extraction on a first initial feature data group, by using an $i^{th}$ one-dimensional convolutional layer in the m one-dimensional convolutional layers, to obtain a second initial feature data group, wherein the first initial feature data group is a feature data group obtained based on the plurality of poses by using an $(i-1)^{th}$ one-dimensional convolutional layer in the m one-dimensional convolutional layers, and i is greater than or equal to 2 and less than or equal to m.

12. The electronic device according to claim 10, wherein the at least two one-dimensional convolutional layers in parallel combination in each backbone model have different cores of different values.

13. The electronic device according to claim 10, wherein the processor performs feature extraction on the initial feature data group, by using the n backbone models in serial combination in the second feature extraction framework, to obtain the one or more pieces of feature data comprises:
the processor is configured to: perform feature extraction on the initial feature data group, by using the n backbone models in serial combination in the second feature extraction framework, to obtain a feature data group; and
obtain, through screening, the one or more pieces of feature data from the feature data group.

14. The electronic device according to claim 10, wherein the display is further configured to display a map, and display at least a part of the icon on the map.

* * * * *